US011818773B2

(12) United States Patent
Mondal et al.

(10) Patent No.: US 11,818,773 B2
(45) Date of Patent: Nov. 14, 2023

(54) CHANNEL ACCESS MECHANISMS FOR DRS TRANSMISSION AND PDCCH MONITORING FOR NR-U NETWORKS

(71) Applicant: Intel Corporation, Santa Clara, CA (US)

(72) Inventors: Bishwarup Mondal, San Ramon, CA (US); Prerana Rane, Santa Clara, CA (US); Yongjun Kwak, Portland, OR (US); Dae Won Lee, Portland, OR (US); Carlos Aldana, Santa Clara, CA (US); Salvatore Talarico, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 16/910,957

(22) Filed: Jun. 24, 2020

(65) Prior Publication Data

US 2020/0329494 A1    Oct. 15, 2020

Related U.S. Application Data

(60) Provisional application No. 62/884,544, filed on Aug. 8, 2019, provisional application No. 62/883,012, filed on Aug. 5, 2019.

(51) Int. Cl.
*H04L 5/00* (2006.01)
*H04W 74/08* (2009.01)
(Continued)

(52) U.S. Cl.
CPC ......... *H04W 74/085* (2013.01); *H04W 48/16* (2013.01); *H04W 72/046* (2013.01)

(58) Field of Classification Search
CPC .. H04W 74/085; H04W 48/16; H04W 72/046
See application file for complete search history.

(56) References Cited

U.S. PATENT DOCUMENTS

| 2018/0084432 A1* | 3/2018 | Kwak ............... H04W 74/0825 |
| 2018/0175986 A1* | 6/2018 | Chendamarai Kannan ................. H04L 5/0048 |

(Continued)

FOREIGN PATENT DOCUMENTS

EP          3331177 B1 *  3/2021  ............. H04J 11/00

*Primary Examiner* — Andre Tacdiran
*Assistant Examiner* — Christopher Nguyen
(74) *Attorney, Agent, or Firm* — Schwegman Lundberg & Woessner, P.A.

(57) ABSTRACT

An apparatus for a UE includes processing circuitry coupled to memory. To configure the UE for shared spectrum channel access in a 5G-NR system, the processing circuitry is to decode a synchronization signal (SS)/physical broadcast channel (PBCH) block (SSB) to obtain a master information block (MIB). System information block 1 (SIB1) configuration information is determined using the MIB. The SIB1 configuration information is used to configure a Type 0 PDCCH common search space (CSS) set (CORESET). The processing circuitry is to monitor for a PDCCH in the Type 0 PDCCH CSS set over slots that include Type 0 PDCCH monitoring occasions. At least one of the slots includes the SSB and the CORESET multiplexed according to multiplexing pattern 1. The PDCCH is detected in at least one of the Type 0 PDCCH monitoring occasions. A SIB1 is decoded using downlink control information (DCI) received via the detected PDCCH.

9 Claims, 23 Drawing Sheets

(51) Int. Cl.
  *H04W 16/14* (2009.01)
  *H04W 72/044* (2023.01)
  *H04W 48/16* (2009.01)

(56) References Cited

U.S. PATENT DOCUMENTS

2019/0029040 A1\* 1/2019 Sun .................... H04W 72/0446
2019/0053177 A1\* 2/2019 Niu ..................... H04W 72/042
2021/0392505 A1\* 12/2021 Harada ............. H04W 74/0808

\* cited by examiner

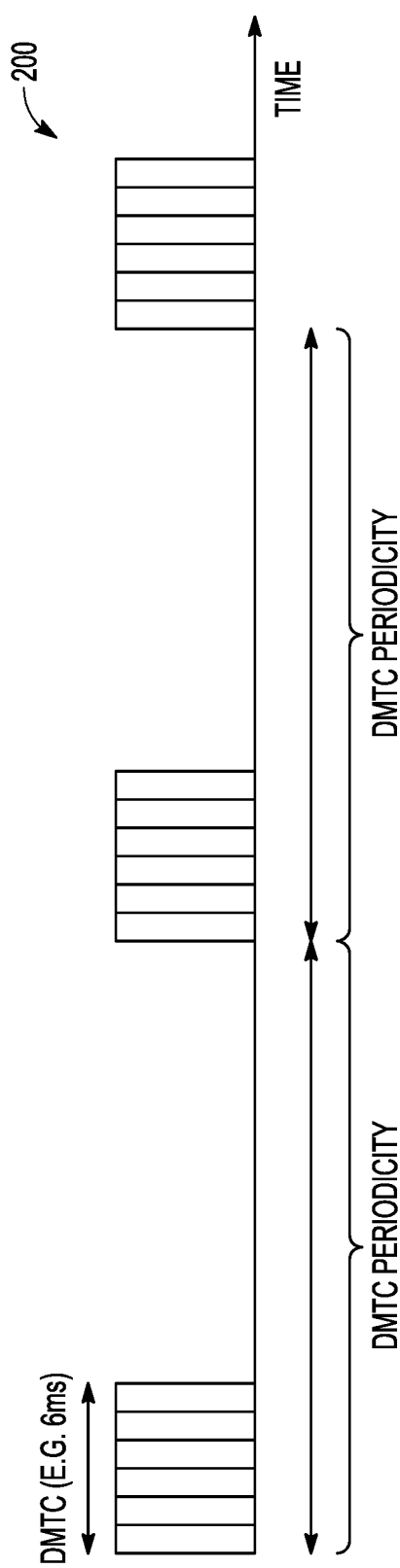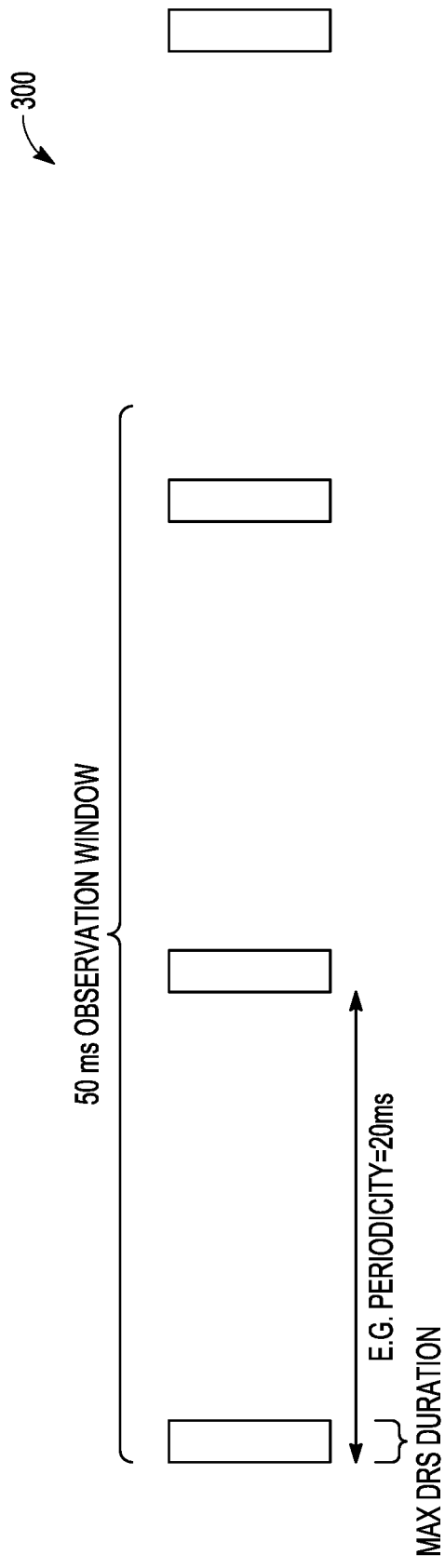

15 kHz

| PARAMETERS | X | M | N | | SSB INDEX |
|---|---|---|---|---|---|
| RMSI CASE 2 | 0 | 0.5 | 2 | 15kHz | 0,1 / 2,3 / 4,5 / 6,7 ... 0,1 / 2,3 / 4,5 / 6,7 |
| RMSI CASE 1 | 0 | 1 | 1 | 15kHz | 0 / 1 / 2 / 3 / 4 / 5 / 6 / 7 |

30 kHz

| | X | M | N | | SSB INDEX |
|---|---|---|---|---|---|
| RMSI CASE 2 | 0 | 0.5 | 2 | 30kHz | 0,1,2,3,4,5,6,7 / 0,1,2,3,4,5,6,7 |
| RMSI CASE 1 | 0 | 1 | 1 | 30kHz | 0 / 1 / 2 / 3 / 4 / 5 / 6 / 7 |
| RMSI CASE 9 | 0 | 2 | 1 | 30kHz | 0 / 1 / 2 / 3 / 4 / 5 / 6 / 7 |

15 kHz

| PARAMETERS | O SET | M | N | MONITORED SLOT | 15 kHz SLOT NUMBER (10 SLOTS = 10 ms) | | | | | | | | | |
|---|---|---|---|---|---|---|---|---|---|---|---|---|---|---|
| | | | | | 0 | 1 | 2 | 3 | 4 | 5 | 6 | 7 | 8 | 9 |
| SSBs: Q=8 | | | | | 0,1 | 2,3 | 4,5 | 6,7 | 0,1 | | | | | |
| RMSI CASE 2 | 0,Q/2 | 0.5 | 2 | 1ST SLOT | 0,1 | 2,3 | 4,5 | 6,7 | 0,1 | | | | | |
| | | | | 2ND SLOT | | 0,1 | 2,3 | 4,5 | 6,7 | | | | | |
| SSBs: Q=6 | | | | | 0,1 | 2,3 | 4,5 | 0,1 | 2,3 | | | | | |
| RMSI CASE 2 | 0,Q/2 | 0.5 | 2 | 1ST SLOT | 0,1 | 2,3 | 4,5 | 0,1 | 2,3 | | | | | |
| | | | | 2ND SLOT | | 0,1 | 2,3 | 4,5 | 0,1 | | | | | |
| SSBs: Q=4 | | | | | 0,1 | 2,3 | 0,1 | 2,3 | 0,1 | | | | | |
| RMSI CASE 2 | 0,Q/2,Q | 0.5 | 2 | 1ST SLOT | 0,1 | 2,3 | 0,1 | 2,3 | 0,1 | | | | | |
| | | | | 2ND SLOT | | 0,1 | 2,3 | 0,1 | 2,3 | | | | | |
| RMSI CASE 1 | 0,Q | 1 | 1 | 1ST SLOT | 0 | 1 | 2 | 3 | 0 | | | | | |
| | | | | 2ND SLOT | | 0 | 1 | 2 | 3 | | | | | |
| SSBs: Q=2 | | | | | 0,1 | 0,1 | 0,1 | 0,1 | 0,1 | | | | | |
| RMSI CASE 2 | 0,Q,2Q | 0.5 | 2 | 1ST SLOT | 0,1 | | 0,1 | | 0,1 | | | | | |
| | | | | 2ND SLOT | | 0,1 | | 0,1 | | | | | | |
| RMSI CASE 1 | 0,Q,2Q | 1 | 1 | 1ST SLOT | 0 | 1 | 0 | 1 | 0 | | | | | |
| | | | | 2ND SLOT | | 0 | 1 | 0 | 1 | | | | | |

30 kHz

| PARAMETERS | O SET | M | N | MONITORED SLOT | 30 kHz SLOT NUMBER (20 SLOTS = 10 ms) | | | | | | | | | | | | | | | | | | | |
|---|---|---|---|---|---|---|---|---|---|---|---|---|---|---|---|---|---|---|---|---|---|---|---|---|
| | | | | | 0 | 1 | 2 | 3 | 4 | 5 | 6 | 7 | 8 | 9 | 10 | 11 | 12 | 13 | 14 | 15 | 16 | 17 | 18 | 19 |
| SSBs: Q=8 | | | | | 0,1,2,3 | 0,1,2,3 | 4,5,6,7 | 0,1,2,3 | 0,1,2,3 | 0,1,2,3 | 4,5,6,7 | 4,5,6,7 | 0,1,2,3 | 0,1,2,3 | | | | | | | | | | |
| RMSI CASE 2 | 0,Q/2,Q | 0.5 | 2 | 1ST SLOT | | 0,1,2,3 | 4,5,6,7 | 0,1,2,3 | 0,1,2,3 | 0,1,2,3 | 4,5,6,7 | 4,5,6,7 | 0,1,2,3 | 0,1,2,3 | | | | | | | | | | |
| | | | | 2ND SLOT | | | 0,1,2,3 | 4,5,6,7 | 6,7 | 0,1 | 2,3 | 4,5 | 6,7 | 0,1 | | | | | | | | | | |
| RMSI CASE 1 | 0,Q | 1 | 1 | | 0 | 1 | 2 | 3 | 4 | 5 | 6 | 7 | 0 | 1 | | | | | | | | | | |
| | | | | | | | | | | | | 7 | 0 | | | | | | | | | | | |
| SSBs: Q=6 | | | | | 0,1,2,3 | 0,1,2,3 | 4,5 | 0,1,2,3 | 0,1,2,3 | 0,1,2,3 | 0,1 | 0,1,2,3 | 4,5 | 0,1 | | | | | | | | | | |
| RMSI CASE 2 | 0,Q/2,Q | 0.5 | 2 | 1ST SLOT | | 0,1,2,3 | 4,5 | 0,1,2,3 | 0,1,2,3 | 0,1,2,3 | 0,1,2,3 | 0,1,2,3 | 4,5 | 0,1 | | | | | | | | | | |
| | | | | 2ND SLOT | | | 0,1,2,3 | 4,5 | 0,1,2,3 | 4,5 | 0,1,2,3 | 0,1 | 4,5 | 2 | | | | | | | | | | |
| RMSI CASE 1 | 0,Q | 1 | 1 | | 0 | 1 | 2 | 3 | 4 | 5 | 0 | 1 | 2 | 2 | | | | | | | | | | |
| SSBs: Q=4 | | | | | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 | | | | | | | | | | |
| RMSI CASE 2 | 0,Q/2,2Q, 3Q/2,2Q | 0.5 | 2 | 1ST SLOT | | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 | | | | | | | | | | |
| | | | | 2ND SLOT | | | 0,1 | 2,3 | 0,1 | 2,3 | 0,1 | 2,3 | 0,1 | 2,3 | | | | | | | | | | |
| RMSI CASE 1 | 0,Q,2Q | 1 | 1 | | 0 | 1 | 2 | 3 | 0 | 1 | 2 | 3 | 0 | 1 | | | | | | | | | | |
| | | | | | | | | | | | | 2 | 3 | | | | | | | | | | | |
| SSBs: Q=2 | | | | | 0,1 | 0,1 | 0,1 | 0,1 | 0,1 | 0,1 | 0,1 | 0,1 | 0,1 | 0,1 | | | | | | | | | | |
| RMSI CASE 2 | 0,Q,2Q, 3Q,4Q | 0.5 | 2 | 1ST SLOT | | 0,1 | 0,1 | 0,1 | 0,1 | 0,1 | 0,1 | 0,1 | 0,1 | 0,1 | | | | | | | | | | |
| | | | | 2ND SLOT | | | 0 | 1 | 0 | 1 | 0 | 1 | 0 | 1 | | | | | | | | | | |
| RMSI CASE 1 | 0,Q,2Q, 3Q,4Q | 1 | 1 | | 0 | 1 | 0 | 1 | 0 | 1 | 0 | 1 | 0 | 1 | | | | | | | | | | |

15 kHz

| PARAMETERS | O SET | M | N | MONITORED SLOT | 15 kHz SLOT NUMBER (10 SLOTS = 10 ms) | | | | | | | | | |
|---|---|---|---|---|---|---|---|---|---|---|---|---|---|---|
| | | | | | 0 | 1 | 2 | 3 | 4 | 5 | 6 | 7 | 8 | 9 |
| SSBs: Q=8 | | | | | 0,1 | 2,3 | 4,5 | 6,7 | 0,1 | | | | | |
| RMSI CASE 1 | 0 | 1 | 1 | 1ST SLOT | 0 | 1 | 2 | 3 | 4 | 5 | 6 | 7 | | |
| | | | | 2ND SLOT | | 0 | 1 | 2 | 3 | 4 | 5 | 6 | 7 | |
| | | | | | | | | | | | | | | |
| SSBs: Q=6 | | | | | 0,1 | 2,3 | 4,5 | 0,1 | 2,3 | | | | | |
| RMSI CASE 1 | 0 | 1 | 1 | 1ST SLOT | 0 | 1 | 2 | 3 | 4 | 5 | | | | |
| | | | | 2ND SLOT | | 0 | 1 | 2 | 3 | 4 | 5 | | | |
| | | | | | | | | | | | | | | |
| SSBs: Q=4 | | | | | 0,1 | 2,3 | 0,1 | 2,3 | 0,1 | | | | | |
| RMSI CASE 1 | 0,Q | 1 | 1 | 1ST SLOT | 0 | 1 | 2 | 3 | 0 | 1 | 2 | 3 | | |
| | | | | 2ND SLOT | | 0 | 1 | 2 | 3 | 0 | 1 | 2 | 3 | |
| | | | | | | | | | | | | | | |
| SSBs: Q=2 | | | | | 0,1 | 0,1 | 0,1 | 0,1 | 0,1 | | | | | |
| RMSI CASE 1 | 0,Q,2Q | 1 | 1 | 1ST SLOT | 0 | 1 | 0 | 1 | 0 | 1 | | | | |
| | | | | 2ND SLOT | | 0 | 1 | 0 | 1 | 0 | 1 | | | |

1300A

FIG. 13A 30 kHz
↙ 1300B

| PARAMETERS | O SET | M | N | MONITORED SLOT | 30 kHz SLOT NUMBER (20 SLOTS = 10 ms) | | | | | | | | | | | | | | | | | | | |
|---|---|---|---|---|---|---|---|---|---|---|---|---|---|---|---|---|---|---|---|---|---|---|---|---|
| | | | | | 0 | 1 | 2 | 3 | 4 | 5 | 6 | 7 | 8 | 9 | 10 | 11 | 12 | 13 | 14 | 15 | 16 | 17 | 18 | 19 |
| SSBs: Q=8 | | | | | | 0,1,2,3 | 4,5,6,7 | 0,1,2,3 | 4,5,6,7 | 0,1,2,3 | 4,5,6,7 | 0,1,2,3 | 4,5,6,7 | | | | | | | | | | | |
| RMSI CASE 1 | 0,Q | 1 | 1 | 1ST SLOT | 0 | 1 | 2 | 3 | 4 | 5 | 6 | 7 | | | | | | | | | | | | |
| | | | | 2ND SLOT | | 0 | 1 | 2 | 3 | 4 | 5 | 6 | 7 | | | | | | | | | | | |
| SSBs: Q=6 | | | | | | 0,1,2,3 | 4,5 | 0,1,2,3 | 4,5 | 0,1,2,3 | 4,5 | 0,1,2,3 | 4,5 | 0,1 | | | | | | | | | | |
| RMSI CASE 1 | 0,Q,2Q | 1 | 1 | 1ST SLOT | 0 | 1 | 2 | 3 | 4 | 5 | 0 | 1 | 2 | 3 | 4 | 5 | 0 | 1 | 2 | 3 | 4 | 5 | | |
| | | | | 2ND SLOT | | 0 | 1 | 2 | 3 | 4 | 5 | 0 | 1 | 2 | 3 | 4 | 5 | 0 | 1 | 2 | 3 | 4 | 5 | | |
| SSBs: Q=4 | | | | | | 0,1,2,3 | | 0,1,2,3 | | 0,1,2,3 | | 0,1,2,3 | | 0,1,2,3 | | | | | | | | | | |
| RMSI CASE 1 | 0,Q,2Q,3Q | 1 | 1 | 1ST SLOT | 0 | 1 | 2 | 3 | 0 | 1 | 2 | 3 | 0 | 1 | 2 | 3 | 0 | 1 | 2 | 3 | | | | |
| | | | | 2ND SLOT | | 0 | 1 | 2 | 3 | 0 | 1 | 2 | 3 | 0 | 1 | 2 | 3 | 0 | 1 | 2 | 3 | | | | |
| SSBs: Q=2 | | | | | | 0,1 | 0,1 | 0,1 | 0,1 | 0,1 | 0,1 | 0,1 | 0,1 | 0,1 | 0,1 | | | | | | | | | |
| RMSI CASE 1 | 0,Q,2Q,3Q | 1 | 1 | 1ST SLOT | 0 | 1 | 0 | 1 | 0 | 1 | 0 | 1 | 0 | 1 | 1 | | | | | | | | | |
| | | | | 2ND SLOT | | 0 | 1 | 0 | 1 | 0 | 1 | 0 | 1 | 0 | 1 | | | | | | | | | |

15 kHz

| PARAMETERS | | | | MONITORED SLOT | 15 kHz SLOT NUMBER (10 SLOTS = 10 ms) | | | | | | | | | | | | | | | | | | | | NEXT DRS TRANSMISSION WINDOW | | | | | | | | | |
|---|---|---|---|---|---|---|---|---|---|---|---|---|---|---|---|---|---|---|---|---|---|---|---|---|---|---|---|---|---|---|---|---|---|---|---|
| | O SET | M | N | | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| SSBs: Q=8 | | | | | | | | | | | | | | | | | | | | | | | | | | | | | | | | | | |
| RMSI CASE 2 | 0,Q/2+TDM{-1,-2,-3} | 0.5 | 2 | 1ST SLOT | 0,1 | 2,3 | 4,5 | 6,7 | 0,1 | | | | | | | | | | | | | | | | 0,1 | 2,3 | 4,5 | 6,7 | 0,1 | | | | | |
| | | | | 2ND SLOT | | 0,1 | 2,3 | 4,5 | 6,7 | | | | | | | | | | | | | | | | | 2,3 | 4,5 | 6,7 | 0,1 | | | | | |
| RMSI CASE 1 | 0,Q+TDM{-2,-7,-4,-1,-6,-3} | 1 | 1 | 1ST SLOT | 0 | | | 5 | 6 | | | | | | | | | | | | | | | | 5 | 6 | 7 | 0 | 1 | | | | | |
| | | | | 2ND SLOT | | 0 | 1 | 2 | 3 | | | | | | | | | | | | | | | | | 5 | 6 | 7 | 0 | | | | | |
| SSBs: Q=6 | | | | | | | | | | | | | | | | | | | | | | | | | | | | | | | | | | |
| RMSI CASE 2 | 0,Q/2+TDM{-2,-1} | 0.5 | 2 | 1ST SLOT | 0,1 | 2,3 | 4,5 | 0,1 | 2,3 | | | | | | | | | | | | | | | | 4,5 | 0,1 | 2,3 | 4,5 | 0,1 | | | | | |
| | | | | 2ND SLOT | | 0,1 | 2,3 | 4,5 | 0,1 | | | | | | | | | | | | | | | | | 4,5 | 0,1 | 2,3 | 4,5 | | | | | |
| RMSI CASE 1 | 0,Q+TDM{-5,-4,-3,-2,-1} | 1 | 1 | 1ST SLOT | 0 | 1 | 2 | 3 | 4 | | | | | | | | | | | | | | | | 5 | 0 | 1 | 2 | 3 | | | | | |
| | | | | 2ND SLOT | | 0 | 1 | 2 | 3 | | | | | | | | | | | | | | | | | 5 | 0 | 1 | 2 | | | | | |
| SSBs: Q=4 | | | | | | | | | | | | | | | | | | | | | | | | | | | | | | | | | | |
| RMSI CASE 2 | 0,Q/2+TDM{-1} | 0.5 | 2 | 1ST SLOT | 0,1 | 2,3 | 0,1 | 2,3 | 0,1 | | | | | | | | | | | | | | | | 2,3 | 0,1 | 2,3 | 0,1 | 2,3 | | | | | |
| | | | | 2ND SLOT | | 0,1 | 2,3 | 0,1 | 2,3 | | | | | | | | | | | | | | | | | 2,3 | 0,1 | 2,3 | 0,1 | | | | | |
| RMSI CASE 1 | 0,Q+TDM{-1,-2,-3} | 1 | 1 | 1ST SLOT | 0 | 1 | 2 | 3 | 0 | | | | | | | | | | | | | | | | 1 | 2 | 3 | 0 | 1 | | | | | |
| | | | | 2ND SLOT | | 0 | 1 | 2 | 3 | | | | | | | | | | | | | | | | | 1 | 2 | 3 | 0 | | | | | |
| SSBs: Q=2 | | | | | | | | | | | | | | | | | | | | | | | | | | | | | | | | | | |
| RMSI CASE 2 | 0,Q,2Q | 0.5 | 2 | 1ST SLOT | 0,1 | 0,1 | 0,1 | 0,1 | 0,1 | | | | | | | | | | | | | | | | 0,1 | 0,1 | 0,1 | 0,1 | 0,1 | | | | | |
| | | | | 2ND SLOT | 0,1 | | 0,1 | | 0,1 | | | | | | | | | | | | | | | | 0,1 | | 0,1 | | 0,1 | | | | | | |
| RMSI CASE 1 | 0,Q,2Q | 1 | 1 | 1ST SLOT | 0 | 1 | 0 | 1 | 0 | | | | | | | | | | | | | | | | 1 | 0 | 1 | 0 | 1 | | | | | |
| | | | | 2ND SLOT | 0 | | 0 | | 0 | | | | | | | | | | | | | | | | 0 | | 0 | | 0 | | | | | | |

30 kHz

| PARAMETERS | O SET | M | N | MONITORED SLOT | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|---|---|---|
| SSBs: Q=8 | | | | | | | | | | | | | | | | | | | | | | | | |
| RMSI CASE 2 | 0,Q/2+TDM {-2} | 0.5 | 2 | 1ST SLOT | 0,1,2,3 | 0,1,2,3 | 4,5,6,7 | 4,5,6,7 | 0,1,2,3 | 0,1,2,3 | 4,5,6,7 | 4,5,6,7 | 0,1,2,3 | 0,1,2,3 | | | | | | | | | | |
|  |  |  |  | 2ND SLOT |  |  | 0,1,2,3 | 0,1,2,3 | 6,7 | 6,7 | 0,1 | 0,1 | 6,7 | 6,7 | 0,1 | | | | | | | | | |
| RMSI CASE 1 | 0,Q+TDM {-2,-4,-6} | 1 | 1 | 1ST SLOT | 0 | 1 | 2 | 3 | 4 | 5 | 6 | 7 | 0 | 1 | | | | | | | | | | |
|  |  |  |  | 2ND SLOT | 0 | 1 | 2 | 3 | 4 | 5 | 6 | 7 | 0 | | | | | | | | | | | |
| SSBs: Q=6 | | | | | | | | | | | | | | | | | | | | | | | | |
| RMSI CASE 2 | 0,Q/2+TDM {-2} | 0.5 | 2 | 1ST SLOT | 0,1,2,3 | 0,1,2,3 | 4,5 | 0,1,2,3 | 0,1,2,3 | 4,5 | 0,1,2,3 | 0,1,2,3 | 4,5 | 0,1 | | | | | | | | | | |
|  |  |  |  | 2ND SLOT |  |  | 0,1,2,3 | 0,1,2,3 | 4,5 | 0,1,2,3 | 0,1,2,3 | 4,5 | 0,1,2,3 | 4,5 | | | | | | | | | | |
| RMSI CASE 1 | 0,Q+TDM {-4,-2} | 1 | 1 | 1ST SLOT | 0 | 1 | 2 | 3 | 4 | 5 | 0 | 1 | 2 | 3 | | | | | | | | | | |
|  |  |  |  | 2ND SLOT | 0 | 1 | 2 | 3 | 4 | 5 | 0 | 1 | 2 | | | | | | | | | | | |
| SSBs: Q=4 | | | | | | | | | | | | | | | | | | | | | | | | |
| RMSI CASE 2 | 0,Q/2, Q, 3Q/2,2Q | 0.5 | 2 | 1ST SLOT | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 | | | | | | | | | | |
|  |  |  |  | 2ND SLOT |  |  | 0,1,2,3 | 0,1,2,3 | 0,1,2,3 | 0,1,2,3 | 0,1,2,3 | 0,1,2,3 | 0,1,2,3 | 0,1,2,3 | | | | | | | | | | |
| RMSI CASE 1 | 0,Q+TDM {-2} | 1 | 1 | 1ST SLOT | 0 | 1 | 2 | 3 | 0 | 1 | 2 | 3 | 0 | 1 | | | | | | | | | | |
|  |  |  |  | 2ND SLOT | 0 | 1 | 2 | 3 | 0 | 1 | 2 | 3 | 0 | | | | | | | | | | | |
| SSBs: Q=2 | | | | | | | | | | | | | | | | | | | | | | | | |
| RMSI CASE 2 | 0,Q,2Q,3Q | 0.5 | 2 | 1ST SLOT | 0,1 | 0,1 | 0,1 | 0,1 | 0,1 | 0,1 | 0,1 | 0,1 | 0,1 | 0,1 | | | | | | | | | | |
|  |  |  |  | 2ND SLOT | 0,1 | 0,1 | 0,1 | 0,1 | 0,1 | 0,1 | 0,1 | 0,1 | 0,1 | | | | | | | | | | | |
| RMSI CASE 1 | 0,Q,2Q,3Q | 1 | 1 | 1ST SLOT | 0 | 1 | 0 | 1 | 0 | 1 | 0 | 1 | 0 | 1 | | | | | | | | | | |
|  |  |  |  | 2ND SLOT | 0 | 1 | 0 | 1 | 0 | 1 | 0 | 1 | 0 | | | | | | | | | | | |

1400C — table titled "NEXT DRS TRANSMISSION WINDOW"

| | 0 | 1 | 2 | 3 | 4 | 5 | 6 | 7 | 8 | 9 | 10-19 |
|---|---|---|---|---|---|---|---|---|---|---|---|
| | 0,1,2,3 | 4,5 | 0,1,2,3 | 6,7 | 0,1,2,3 | 4,5 | 0,1,2,3 | 6,7 | 0,1,2,3 | 4,5 | |
| | 4,5,6,7 | 0,1,2,3 | 4,5,6,7 | 0,1,2,3 | 4,5,6,7 | 0,1,2,3 | 4,5,6,7 | 0,1,2,3 | 4,5,6,7 | | |
| | | 4,5 | 6,7 | 0,1,2,3 | 4,5 | 6,7 | 0,1,2,3 | 4,5 | | | |
| | 2 | 3 | 4 | 5 | 6 | 7 | 0 | 1 | 2 | 3 | |
| | | 2 | 3 | 4 | 5 | 6 | 7 | 0 | 1 | 2 | |
| | 0,1,2,3 | 4,5 | 0,1,2,3 | 4,5 | 0,1,2,3 | 4,5 | 0,1,2,3 | 4,5 | 0,1,2,3 | 0,1 | |
| | 2,3,4,5 | 0,1,2,3 | 4,5 | 0,1,2,3 | 4,5 | 0,1,2,3 | 4,5 | 0,1,2,3 | | | |
| | | 2,3 | 4,5 | 0,1,2,3 | 4,5 | 0,1,2,3 | 4,5 | 0,1,2,3 | 4,5 | 0,1 | |
| | 4 | 5 | 0 | 1 | 2 | 3 | 4 | 5 | 0 | 1 | |
| | | 4 | 5 | 0 | 1 | 2 | 3 | 4 | 5 | 0 | |
| | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 | |
| | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 | |
| | | 0,1,2,3 | 0,1,2,3 | 0,1,2,3 | 0,1,2,3 | 0,1,2,3 | 0,1,2,3 | 0,1,2,3 | 0,1 | 0,1 | |
| | 2 | 3 | 0 | 1 | 2 | 3 | 0 | 1 | 2 | 3 | |
| | | 2 | 3 | 0 | 1 | 2 | 3 | 0 | 1 | 2 | |
| | 0,1 | 0,1 | 0,1 | 0,1 | 0,1 | 0,1 | 0,1 | 0,1 | 0,1 | 0,1 | |
| | 0,1 | 0,1 | 0,1 | 0,1 | 0,1 | 0,1 | 0,1 | 0,1 | 0,1 | 0,1 | |
| | | | 0,1 | | 0,1 | | 0,1 | | 0,1 | | |
| | 0 | 1 | 0 | 1 | 0 | 1 | 0 | 1 | 0 | 1 | |
| | | 0 | 1 | 0 | 1 | 0 | 1 | 0 | 1 | 0 | |

15 kHz

| PARAMETERS | O SET | M | N | MONITORED SLOT | 15 kHz SLOT NUMBER (10 SLOTS = 10 ms) |||||||||||| NEXT DRS TRANSMISSION WINDOW ||||||||||
|---|---|---|---|---|---|---|---|---|---|---|---|---|---|---|---|---|---|---|---|---|---|---|---|---|
| | | | | | 0 | 1 | 2 | 3 | 4 | 5 | 6 | 7 | 8 | 9 | 0 | 1 | 2 | 3 | 4 | 5 | 6 | 7 | 8 | 9 |
| SSBs: Q=8 | | | | | | | | | | | | | | | | | | | | | | | | |
| RMSI CASE 2 | 0,Q/2+TDM {-1,-2,-3} | 0.5 | 2 | 1ST SLOT | | | | | | 0,1 | 2,3 | 4,5 | 6,7 | 0,1 | | | | | | 2,3 | 4,5 | 6,7 | 0,1 | 2,3 |
| | | | | 2ND SLOT | | | | | | | | 2,3 | 4,5 | 6,7 | | | | | | | 2,3 | 4,5 | 6,7 | 0,1 |
| RMSI CASE 1 | 0,Q+TDM {-5,-2,-7,-4} | 1 | 1 | 1ST SLOT | | | | | | 0 | 1 | 2 | 3 | 4 | | | | | | 5 | 6 | 7 | 0 | 1 |
| | | | | 2ND SLOT | | | | | | | | 1 | 2 | 3 | | | | | | | 5 | 6 | 7 | 0 |
| SSBs: Q=6 | | | | | | | | | | | | | | | | | | | | | | | | |
| RMSI CASE 2 | 0,Q/2+TDM {-2,-1} | 0.5 | 2 | 1ST SLOT | | | | | | 0,1 | 2,3 | 4,5 | 0,1 | 2,3 | | | | | | 0,1 | 2,3 | 4,5 | 0,1 | 2,3 |
| | | | | 2ND SLOT | | | | | | 0,1 | 2,3 | 4,5 | 0,1 | 2,3 | | | | | | 4,5 | 0,1 | 2,3 | 4,5 | 0,1 |
| RMSI CASE 1 | 0,Q+TDM {-5,-4,-3,-2,-1} | 1 | 1 | 1ST SLOT | | | | | | 0 | 1 | 2 | 3 | 4 | | | | | | 5 | 0 | 1 | 2 | 3 |
| | | | | 2ND SLOT | | | | | | 0 | 1 | 2 | 3 | 4 | | | | | | 5 | 0 | 1 | 2 | 3 |
| SSBs: Q=4 | | | | | | | | | | | | | | | | | | | | | | | | |
| RMSI CASE 2 | 0,Q/2+TDM {-1} | 0.5 | 2 | 1ST SLOT | | | | | | 0,1 | 2,3 | 0,1 | 2,3 | 0,1 | | | | | | 2,3 | 0,1 | 2,3 | 0,1 | 2,3 |
| | | | | 2ND SLOT | | | | | | 0,1 | 2,3 | 0,1 | 2,3 | 0,1 | | | | | | 2,3 | 0,1 | 2,3 | 0,1 | 2,3 |
| RMSI CASE 1 | 0,Q+TDM {-1,-2,-3} | 1 | 1 | 1ST SLOT | | | | | | 0 | 1 | 2 | 3 | 0 | | | | | | 1 | 2 | 3 | 0 | 1 |
| | | | | 2ND SLOT | | | | | | 0 | 1 | 2 | 3 | 0 | | | | | | 1 | 2 | 3 | 0 | 1 |
| SSBs: Q=2 | | | | | | | | | | | | | | | | | | | | | | | | |
| RMSI CASE 2 | 0,Q,2Q | 0.5 | 2 | 1ST SLOT | | | | | | 0,1 | 0,1 | 0,1 | 0,1 | 0,1 | | | | | | 0,1 | 0,1 | 0,1 | 0,1 | 0,1 |
| | | | | 2ND SLOT | | | | | | 0,1 | | | | 0,1 | | | | | | 0,1 | | | | 0,1 |
| RMSI CASE 1 | 0,Q,2Q | 1 | 1 | 1ST SLOT | | | | | | 0 | 1 | 0 | 1 | 0 | | | | | | 0 | 1 | 0 | 1 | 0 |
| | | | | 2ND SLOT | | | | | | 0 | 1 | 0 | 1 | 0 | | | | | | 0 | 1 | 0 | 1 | 1 |

1500A

FIG. 15A 30 kHz

| PARAMETERS | O SET | M | N | MONITORED SLOT | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|---|---|---|
| SSBs: Q=8 | | | | | | | | | | | | | | | 0,1,2,3 | 0,1,2,3 | 4,5,6,7 | 4,5,6,7 | 0,1,2,3 | 0,1,2,3 | 4,5,6,7 | 4,5,6,7 | 0,1,2,3 | 0,1,2,3 |
| RMSI CASE 2 | 0,Q/2+TDM {-2} | 0.5 | 2 | 1ST SLOT | | | | | | | | | | | 0,1,2,3 | 0,1,2,3 | 4,5,6,7 | 4,5,6,7 | 0,1,2,3 | 0,1,2,3 | 4,5,6,7 | 4,5,6,7 | 0,1,2,3 | 0,1,2,3 |
| | | | | 2ND SLOT | | | | | | | | | | | | | 0,1,2,3 | 4,5,6,7 | 0,1,2,3 | 4,5,6,7 | 0,1,2,3 | 4,5,6,7 | 0,1,2,3 | |
| RMSI CASE 1 | 0,Q+TDM {-2,-4,-6} | 1 | 1 | 1ST SLOT | | | | | | | | | | 0 | 0 | 1 | 2 | 3 | 4 | 5 | 6 | 7 | 0 | 1 |
| | | | | 2ND SLOT | | | | | | | | | | | | 0 | 1 | 2 | 3 | 4 | 5 | 6 | 7 | 0 |
| SSBs: Q=6 | | | | | | | | | | | | | | | 0,1,2,3 | 0,1,2,3 | 4,5 | 4,5 | 0,1,2,3 | 0,1,2,3 | 4,5 | 4,5 | 0,1,2,3 | 0,1,2,3 |
| RMSI CASE 2 | 0,Q/2+TDM {-2} | 0.5 | 2 | 1ST SLOT | | | | | | | | | | | 0,1,2,3 | 0,1,2,3 | 4,5 | 4,5 | 0,1,2,3 | 0,1,2,3 | 4,5 | 4,5 | 0,1,2,3 | 0,1,2,3 |
| | | | | 2ND SLOT | | | | | | | | | | | | | 0,1,2,3 | 4,5 | 0,1,2,3 | 4,5 | 0,1,2,3 | 4,5 | 0,1,2,3 | |
| RMSI CASE 1 | 0,Q+TDM {-4,-2} | 1 | 1 | 1ST SLOT | | | | | | | | | | 0 | 0 | 1 | 2 | 3 | 4 | 5 | 0 | 1 | 2 | 3 |
| | | | | 2ND SLOT | | | | | | | | | | | | 0 | 1 | 2 | 3 | 4 | 5 | 0 | 1 | 2 |
| SSBs: Q=4 | | | | | | | | | | | | | | | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 |
| RMSI CASE 2 | 0,Q/2, Q, 3Q/2,2Q | 0.5 | 2 | 1ST SLOT | | | | | | | | | | | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 | 0,1,2,3 |
| | | | | 2ND SLOT | | | | | | | | | | | | | 0,1,2,3 | 0,1,2,3 | 0,1,2,3 | 0,1,2,3 | 0,1,2,3 | 0,1,2,3 | 0,1,2,3 | |
| RMSI CASE 1 | 0,Q+TDM {-2} | 1 | 1 | 1ST SLOT | | | | | | | | | | 0 | 0 | 1 | 2 | 3 | 0 | 1 | 2 | 3 | 0 | 1 |
| | | | | 2ND SLOT | | | | | | | | | | | | 0 | 1 | 2 | 3 | 0 | 1 | 2 | 3 | 0 |
| SSBs: Q=2 | | | | | | | | | | | | | | | 0,1 | 0,1 | 0,1 | 0,1 | 0,1 | 0,1 | 0,1 | 0,1 | 0,1 | 0,1 |
| RMSI CASE 2 | 0,Q,2Q,3Q | 0.5 | 2 | 1ST SLOT | | | | | | | | | | | 0,1 | 0,1 | 0,1 | 0,1 | 0,1 | 0,1 | 0,1 | 0,1 | 0,1 | 0,1 |
| | | | | 2ND SLOT | | | | | | | | | | | | | 0,1 | 0,1 | 0,1 | 0,1 | 0,1 | 0,1 | 0,1 | |
| RMSI CASE 1 | 0,Q,2Q,3Q | 1 | 1 | 1ST SLOT | | | | | | | | | | 0 | 0 | 1 | 0 | 1 | 0 | 1 | 0 | 1 | 0 | 1 |
| | | | | 2ND SLOT | | | | | | | | | | | | 0 | 1 | 0 | 1 | 0 | 1 | 0 | 1 | 0 |

30 kHz SLOT NUMBER (20 SLOTS = 10 ms)

CHANNEL ACCESS MECHANISMS FOR DRS TRANSMISSION AND PDCCH MONITORING FOR NR-U NETWORKS

PRIORITY CLAIM

This application claims the benefit of priority to:

United States Provisional Patent Application Ser. No. 62/883,012, filed Aug. 5, 2019, and entitled "TYPE-0 PDCCH CSS MONITORING FOR NR-U"; and U.S. Provisional Patent Application Ser. No. 62/884,544, filed Aug. 8, 2019, and entitled "CHANNEL ACCESS MECHANISMS FOR DISCOVERY REFERENCE SIGNAL (DRS) TRANSMISSION FOR NEW RADIO (NR) SYSTEMS OPERATING ON UNLICENSED SPECTRUM."

Each of the above-listed applications is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks, 5G-LTE networks, and 5G NR unlicensed spectrum (NR-U) networks. Other aspects are directed to techniques for Type-0 physical downlink control channel (PDCCH) common search space (CSS) monitoring for NR-U networks. Additional aspects are related to channel access mechanisms for discovery reference signal (DRS) transmission for NR systems operating in the unlicensed spectrum.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in some disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as the unlicensed spectrum is expected in future releases and 5G systems. Such enhanced operations can include the design and configuration of Type-0 PDCCH CSS monitoring for NR-U networks. Additional aspects are related to channel access mechanisms for DRS transmission for NR systems operating in the unlicensed spectrum.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 2 illustrates a Discovery Measurement Timing Configuration (DMTC) window, in an example embodiment.

FIG. 3 illustrates the measurement of total DRS duration within an observation window, in an example embodiment.

FIG. 10 illustrates RMSI configurations for 15 kHz and 30 kHz sub-carrier spacing in an NR frequency range 1 (NR-FR1) system, in an example embodiment.

FIG. 12A and FIG. 12B illustrate RMSI configurations for 15 kHz and 30 kHz sub-carrier spacing in an NR system with a maximum number of beams (Q) restricted to 2, 4, 6, or 8, in an example embodiment.

FIG. 13A and FIG. 13B illustrate RMSI configurations for 15 kHz and 30 kHz sub-carrier spacing in an NR system with a maximum number of beams (Q) restricted to 2, 4, 6, or 8 and RMSI transmission beyond a DRS/DMTC window of 5 ms, in an example embodiment.

FIG. 14A, FIG. 14B, and FIG. 14C illustrate RMSI configurations for 15 kHz and 30 kHz sub-carrier spacing in an NR system with a maximum number of beams (Q) restricted to 2, 4, 6, or 8 and continuous RMSI monitoring in next DRS/DMTC transmission window, in an example embodiment.

FIG. 15A, FIG. 15B, and FIG. 15C illustrate RMSI configurations for 15 kHz and 30 kHz sub-carrier spacing in an NR system with a maximum number of beams (Q) restricted to 2, 4, 6, or 8 and a second slot DRS transmission, in an example embodiment.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
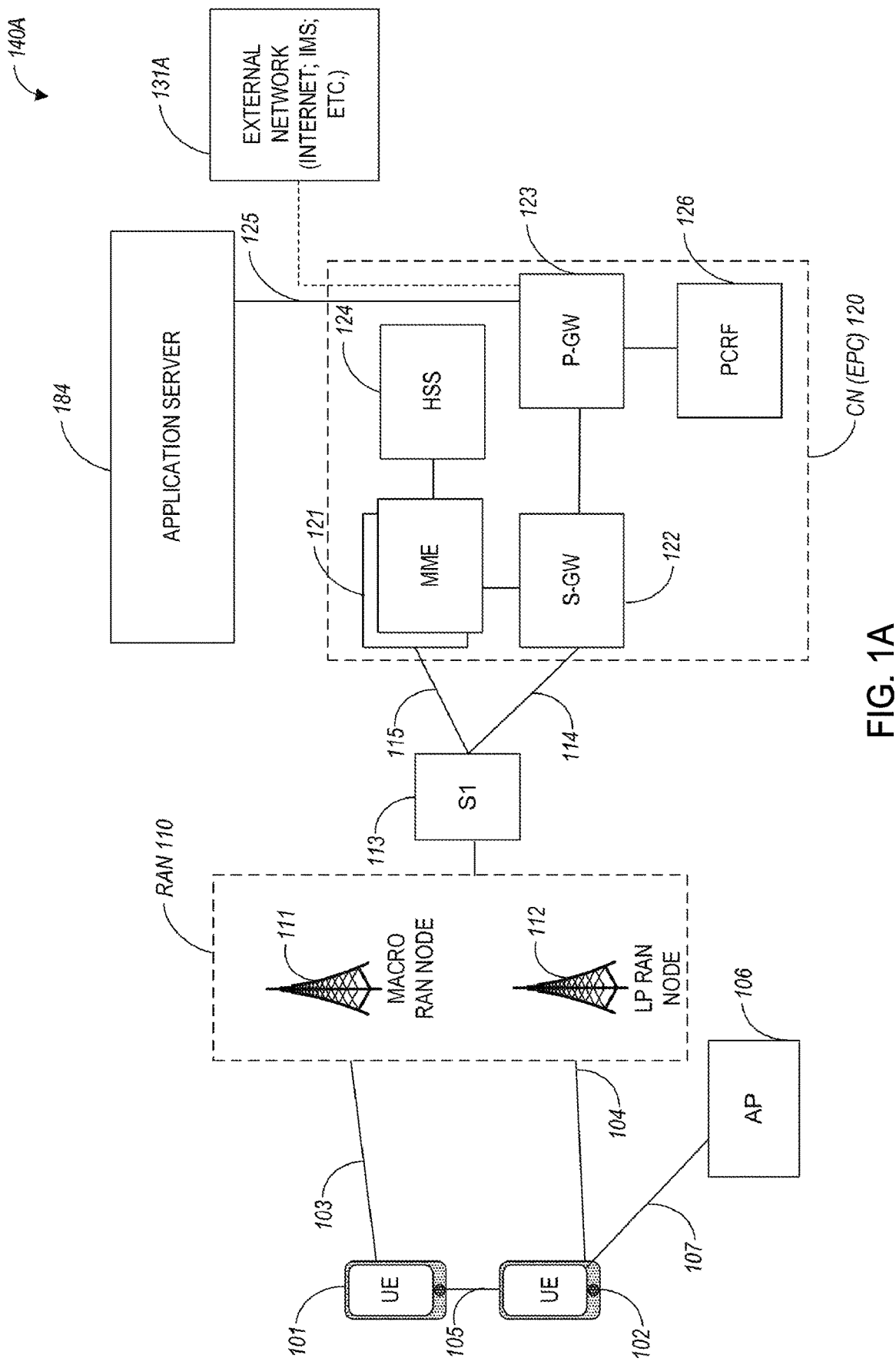
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN. In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
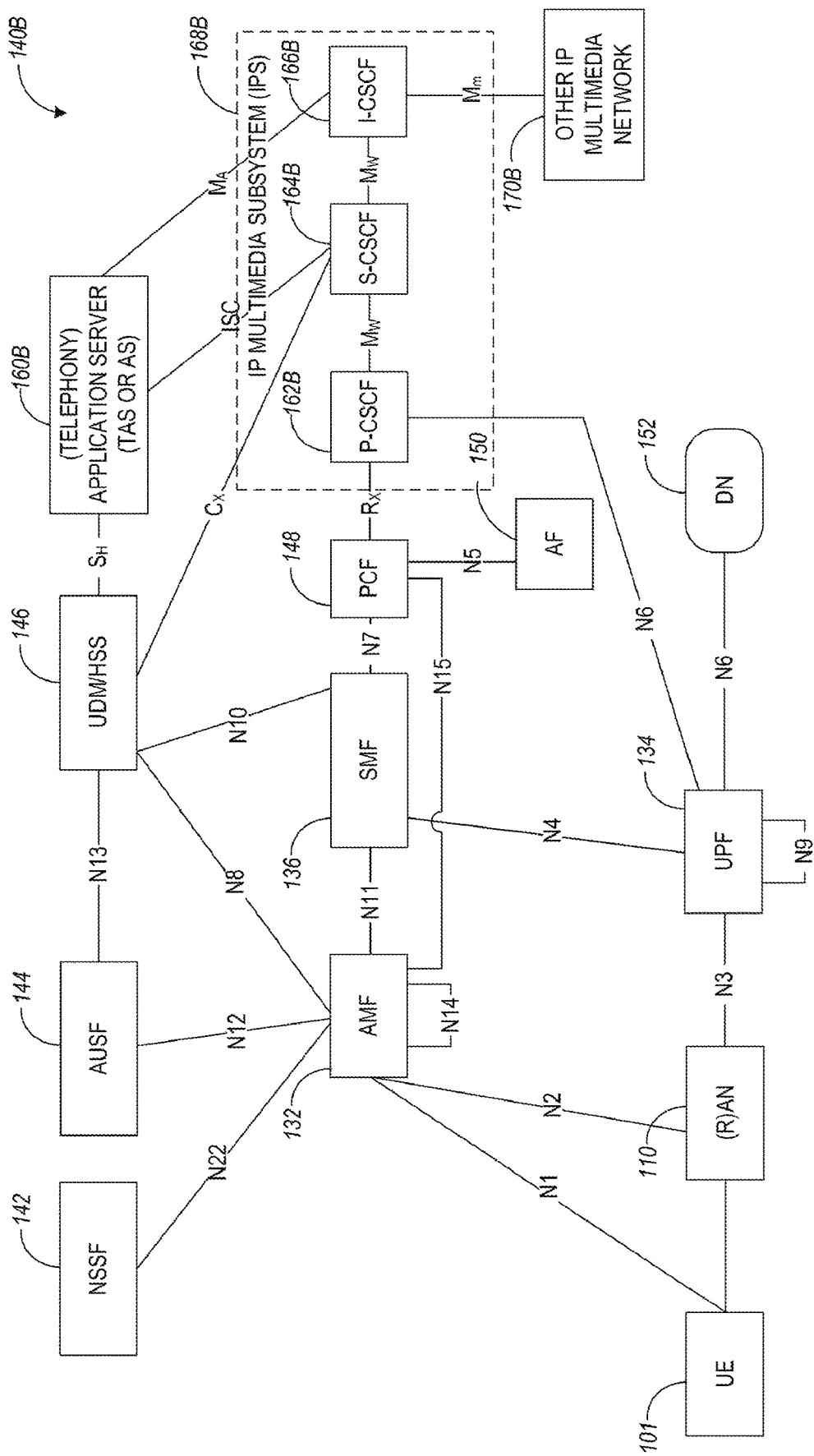
FIG. 1B and FIG. 1C illustrate a non-roaming 5G system architecture, in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
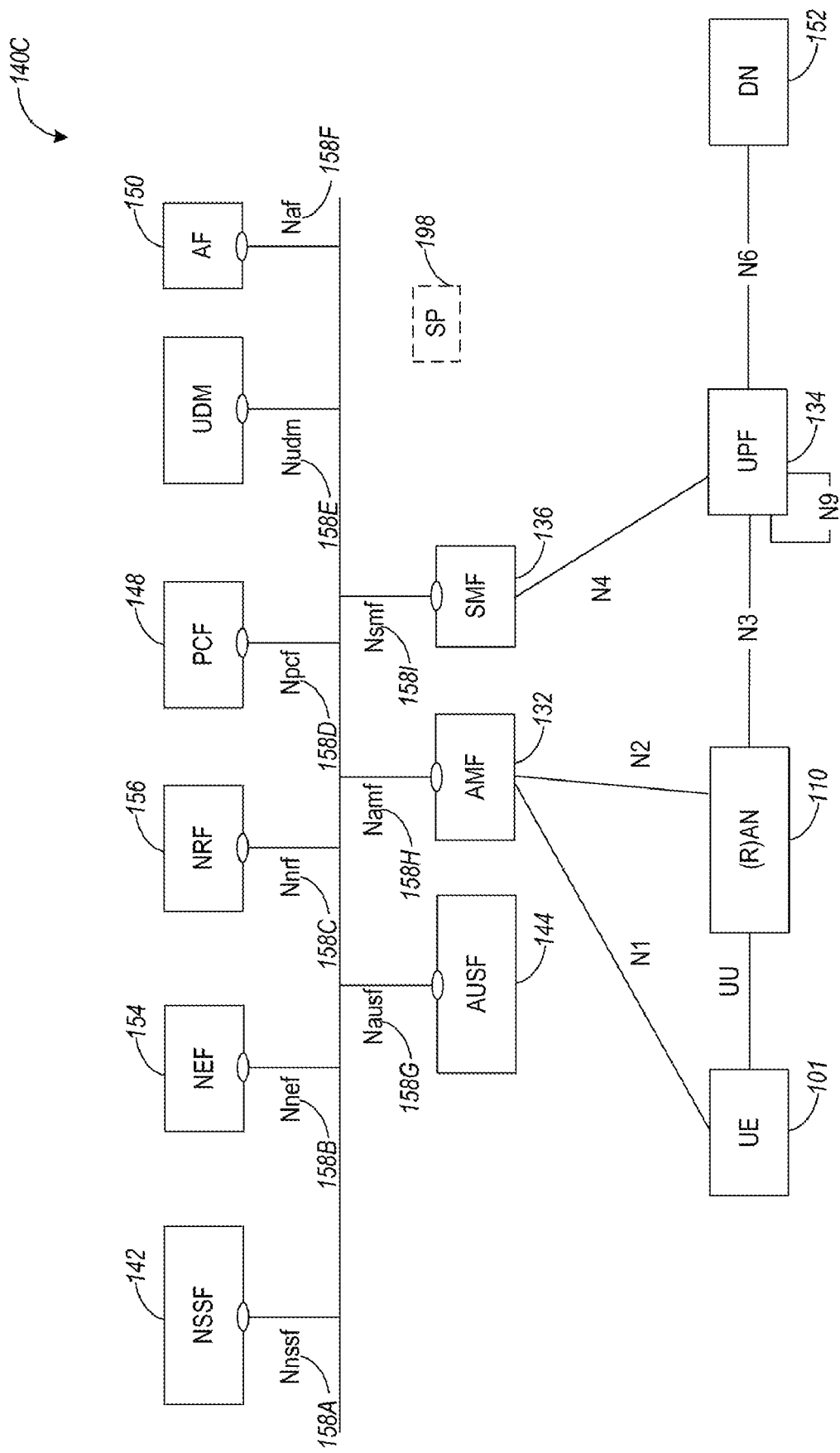

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE or a base station (e.g., any of the UEs or base stations illustrated in connection with FIG. 1A-FIG. 1C).

Each year, the number of mobile devices connected to wireless networks significantly increases. To keep up with the demand in mobile data traffic, necessary changes have to be made to system requirements to be able to meet these demands. Three critical areas that need to be enhanced to deliver this increase in traffic are larger bandwidth, lower latency, and higher data rates.

One of the limiting factors in wireless innovation is the availability in the spectrum. To mitigate this, the unlicensed spectrum has been an area of interest to expand the availability of LTE. In this context, one of the major enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

Now that the main building blocks for the framework of NR have been established, a natural enhancement is to allow this to also operate on unlicensed spectrum. The work to introduce shared/unlicensed spectrum in 5G NR has already started, and objectives can include:

Physical layer aspects including [RAM]:
Frame structure including single and multiple DL to UL and UL to DL switching points within a shared COT with associated identified LBT requirements (TR Section 7.2.1.3.1).
Uplink (UL) data channel including an extension of PUSCH to support PRB-based frequency block-interlaced transmission; support of multiple PUSCH(s) starting positions in one or multiple slots depending on the LBT outcome with the understanding that the ending position is indicated by the UL grant; design not requiring the UE to change a granted TBS for a PUSCH transmission depending on the LBT outcome. The necessary PUSCH enhancements based on CP-OFDM. Applicability of sub-PRB frequency block-interlaced transmission for 60 kHz is to be decided by RAN1.
Physical layer procedure(s) including [RAN1, RAN2]:
For LBE, the channel access mechanism in line with agreements from the NR-U study item (TR 38.889, Section 7.2.1.3.1). Specification work to be performed by RAN1.
HARQ operation: NR HARQ feedback mechanisms are the baseline for NR-U operation with extensions in line with agreements during the study phase (NR-U TR section 7.2.1.3.3), including the immediate transmission of HARQ A/N for the corresponding data in the same shared COT as well as transmission of HARQ A/N in a subsequent COT. Potentially support mechanisms to provide multiple and/or supplemental time and/or frequency domain transmission opportunities.
Scheduling multiple TTIs for PUSCH in-line with agreements from the study phase (TR 38.889, Section 7.2.1.3.3). (RAN1)
Configured Grant operation: NR Type-1 and Type-2 configured grant mechanisms are the baseline for NR-U operation with modifications in line with agreements during the study phase (NR-U TR section 7.2.1.3.4). (RAN1)

Data multiplexing aspects (for both UL and DL) considering LBT and channel access priorities. (RAN1/RAN2)

It is important to identify aspects of the design that can be enhanced for NR when operating in an unlicensed spectrum. One of the challenges, in this case, is that this system must maintain fair coexistence with other incumbent technologies, and to do so depending on the particular band in which it might operate some restrictions might be taken into account when designing this system. For instance, if operating in the 5 GHz band, a listen before talk (LBT) procedure needs to be performed in some parts of the spectrum to acquire the medium before a transmission can occur. For this particular band, the ETSI EN 301 893 provides the regulatory requirements that must be met to be able to operate within the EU or other countries that follow the ETSI rules.

In the LAA design, to reduce the initial access acquisition time, and to increase the likelihood to access the channel, a DMTC window was introduced. In LAA, the DMTC window is 6 ms long and occurs with a periodicity of 40/80/160 ms. Within the DMTC window, the eNB has six opportunities to access the channel and transmit the DRS. In NR-U, a similar concept has been adopted and agreed upon. However, for NR-U the maximum DMTC window is 5 ms long, allowing 5 opportunities to the gNB to access the channel for 15 kHz subcarrier spacing if 15 kHz SCS is used. While for 15 kHz subcarrier spacing, a gNB in NR-U has fewer opportunities to access the channel compared to LAA, for higher subcarrier spacing (i.e., 30/60) the number of occasions is considerably higher, which poses an issue in terms of coexistence between NR-U and LAA, but more importantly with other incumbent technologies like Wi-Fi. In this invention, several channel access methods are described.

FIG. 2 illustrates a diagram 200 with a DMTC window, in an example embodiment.

To cope with the use of LBT which is mandated by the regulatory requirements when operating in the 5 GHz unlicensed band, in Rel. 13 during the LAA design, the concept of discovery measurement timing configuration (DMTC) was introduced. The DMTC is a window in which the eNB is allowed to perform multiple Cat-2 LBT attempts at each of the subframe boundaries. The DMTC window in LAA is 6 ms long, allowing for 6 different Cat-2 LBT attempts, and it repeats every 40, 80, or 160 ms, as illustrated in FIG. 2.

FIG. 3 illustrates a diagram 300 with measurement of total DRS duration within an observation window, in an example embodiment.

DRS signals are considered to be "Short Control Signalling transmissions", defined in ETSI EN301893 v2.1.1 (2017-05). The restrictions associated with such signals are: (a) within an observation period of 50 ms, the number of Short Control Signaling Transmissions by the equipment shall be equal to or less than 50; and (b) the total duration of the equipment's Short Control Signaling Transmissions shall be less than 2500 µs within the said observation period.

Note that the observation period is any sliding window of time. A Periodicity=20 ms example of how this would be measured is shown in FIG. 3. If no other signal is present, the spectrum analyzer would be triggered by the start of the DRS signal. In FIG. 3, in a 50 ms observation window, 3 instances will appear, and to meet the 2.5 ms duration, each instance should be a maximum duration of 2.5 ms/3=0.83 ms.

In 3GPP's TR 38.889, 25 us CAT2 LBT is allowed for DRS duration up to 1 ms. Unless the gNB changes the DRS on a dynamic basis to meet the 2.5 ms duration limit over any 50 ms observation window, the 1 ms DRS limit and Periodicity set to 20 ms would result in failing regulatory ETSI EN 301893 constraints. Also, the 1 ms limit is too constraining for large values of Periodicity and should be relaxed. To meet the constraints in ETSI EN 301893, the maximum DRS duration may be a function of the periodicity and may be limited by 2500 µs/(ceiling(50 ms/Periodicity)), where the Periodicity is 5, 10, 20, 40, 80, or 160 ms, as defined in Section 5.5.2.10 of TS 38.331. This leads to the following Table 1 listing maximum DRS Duration values for different Periodicity: Note that 0.5 is equal to 1 slot duration in 30 kHz sub-carrier spacing (SCS) and 1 ms is equal to 1 slot duration in 15 kHz SCS. The proposed values in the table below avoid fractional slot transmissions.

Alternatively, fractional slot transmissions could be allowed where the first few or last few contiguous OFDM symbols of a slot are transmitted. This allows the base station to achieve 0.83 ms or 1.25 ms transmission duration in the cases when the Periodicity is set to 20 ms or 40 ms, respectively.

TABLE 1

| PERIODICITY | MAX DRS DURATION (MS) BASED ON REGULATIONS | PROPOSED VALUE OF MAX DRS DURATION (MS) |
|---|---|---|
| 5 ms | 0.25 | periodicity not allowed |
| 10 ms | 0.5 | periodicity not allowed |
| 20 ms | 0.8333 | 0.5 or periodicity not allowed |
| 25 ms? | 1 | 1 |
| 40 ms | 1.25 | 1 |
| 80 ms | 2.5 | 2 or 2.5 |
| 160 ms | 2.5 | 2 or 2.5 |

Another embodiment is to limit the DRS Periodicity to values greater than or equal to 40 ms, as in done in LAA.

In LAA, the DMTC window is fixed at 6 ms. In NR, the maximum DRS transmission window duration is 5 ms. It might be advantageous to discretize the DRS transmission window to smaller sizes to allow for reduced power consumption at the UE and to have less overhead in a less congested environment. In one embodiment, this would mean that that the DRS transmission window could take on values of {0.5, 1, 1.5, 2, 2.5, 3, 3.5, 4, 4.5, and 5} ms. Another embodiment would be to have the values {1, 2, 3, 4, and 5} ms.

During Rel. 16, a similar concept to DMTC has been adopted for NR-U. However, it has been agreed that the DRS transmission window would be a maximum duration of 5 ms and independent of the subcarrier spacing. This poses some issues in terms of co-existence, since for higher subcarrier spacing the number of opportunities that the gNB has may greatly increase: for 15 kHz subcarrier spacing and 1 ms DRS duration, the gNB has 5 LBT attempts; for 30 kHz subcarrier spacing, the gNB has 10 LBT attempts; for 60 kHz subcarrier spacing, the gNB has 20 LBT attempts. To limit the degradation to other incumbent technologies, the following options may be used:

Option 1: In one embodiment, regardless of the subcarriers spacing, the gNB performs Cat-2 LBT for each of the available occasions within the DMTC window, as shown in FIG. 4.

Figure 4:
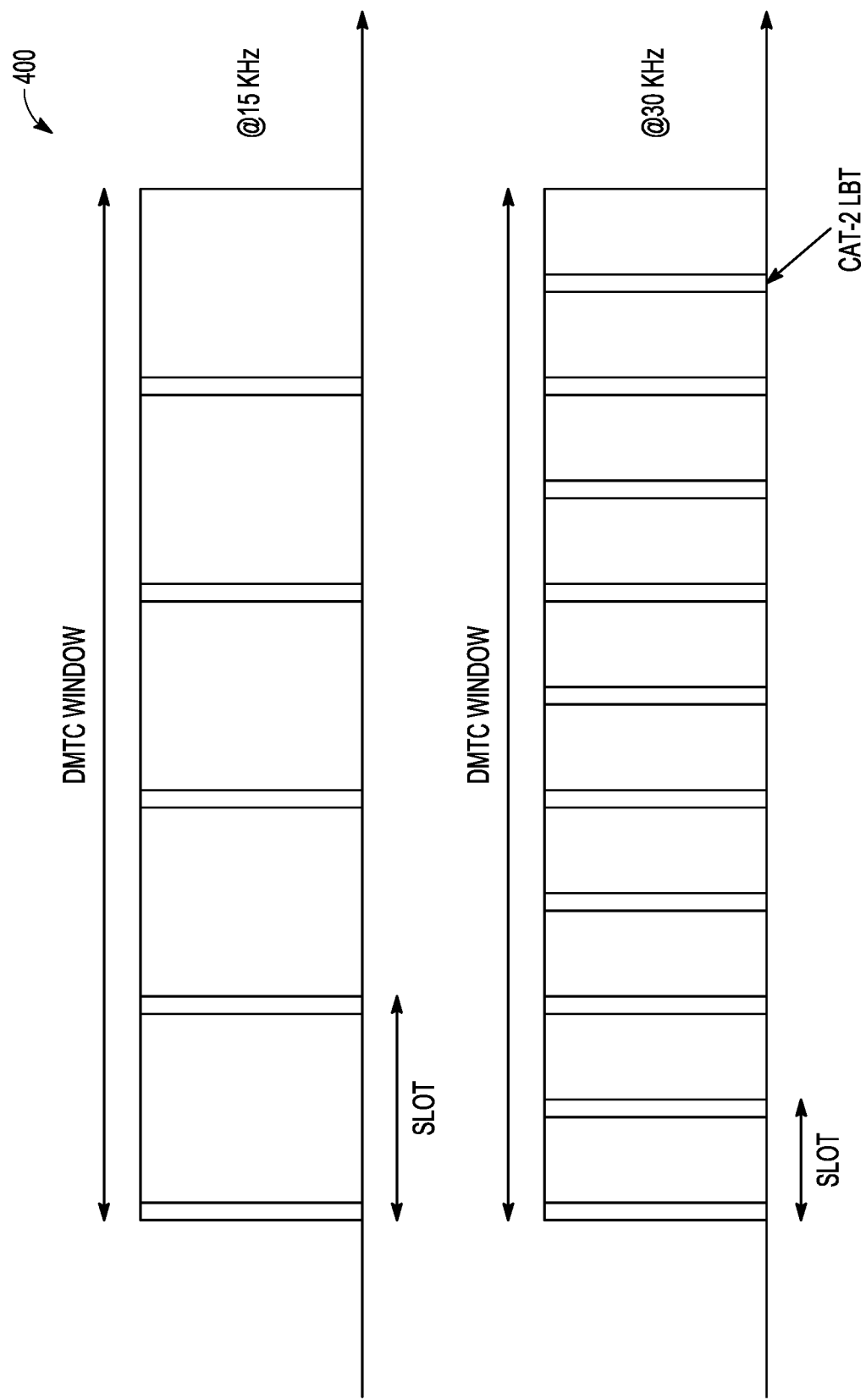
FIG. 4 illustrates category 2 (Cat-2) listen-before-talk (LBT) procedure for multiple SSB transmission occasions within a DMTC window, in an example embodiment.

FIG. 4 illustrates category 2 (Cat-2) listen-before-talk (LBT) procedure 400 for multiple SSB transmission occasions within a DMTC window, in an example embodiment.

Option 2: In one embodiment, regardless of the subcarriers spacing, the gNB always uses Cat-4 LBT with the highest priority class within the DMTC window, as shown in FIG. 5.

Figure 5:
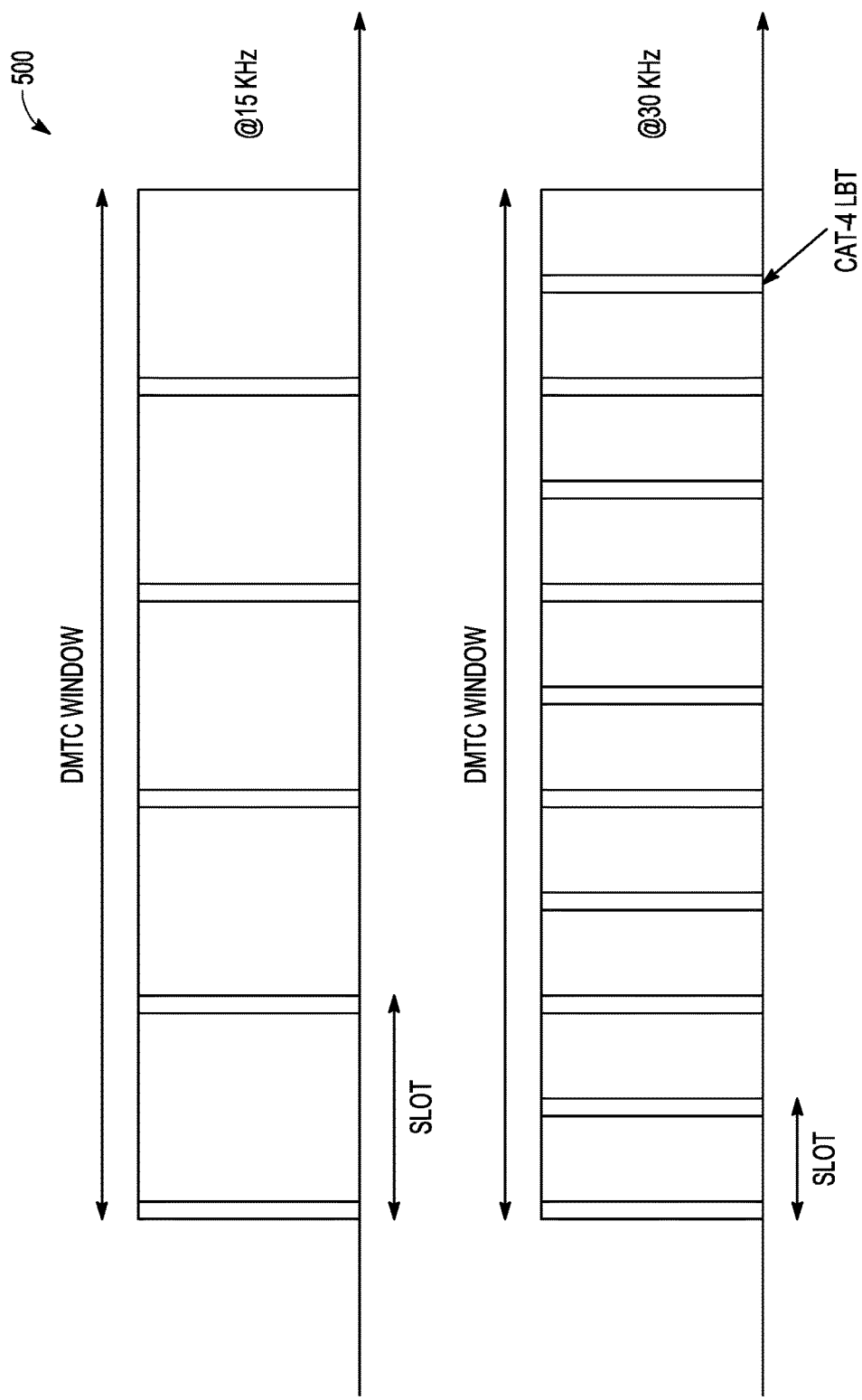
FIG. 5 illustrates category 4 (Cat-4) LBT procedure for multiple SSB transmission occasions within a DMTC window, in an example embodiment.

FIG. 5 illustrates category 4 (Cat-4) LBT procedure 500 for multiple SSB transmission occasions within a DMTC window, in an example embodiment.

Option 3: In one embodiment, regardless of the subcarriers spacing, the gNB performs Cat-2 LBT (shown in yellow) for the first X occasions, and then it performs Cat-4 LBT (shown in orange) for the remaining occasions, where an example X=5 is illustrated in FIG. 6.

Figure 6:
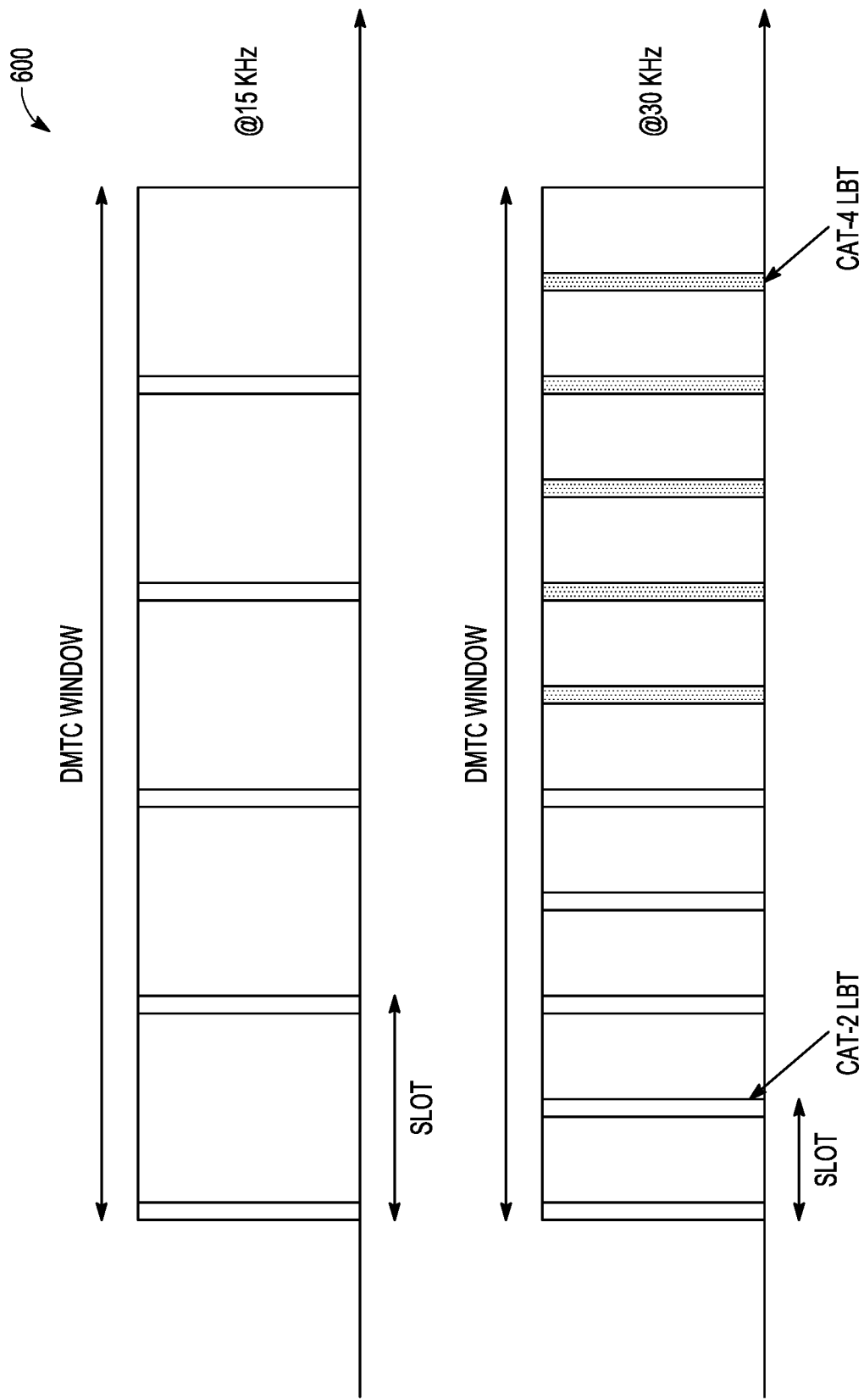
FIG. 6 illustrates Cat-2 LBT for each of X SSB occasions followed by Cat-4 LBT for the remaining SSB occasions, in an example embodiment.

FIG. 6 illustrates a procedure 600 with Cat-2 LBT for each of X SSB occasions followed by Cat-4 LBT for the remaining SSB occasions, in an example embodiment.

Figure 7:
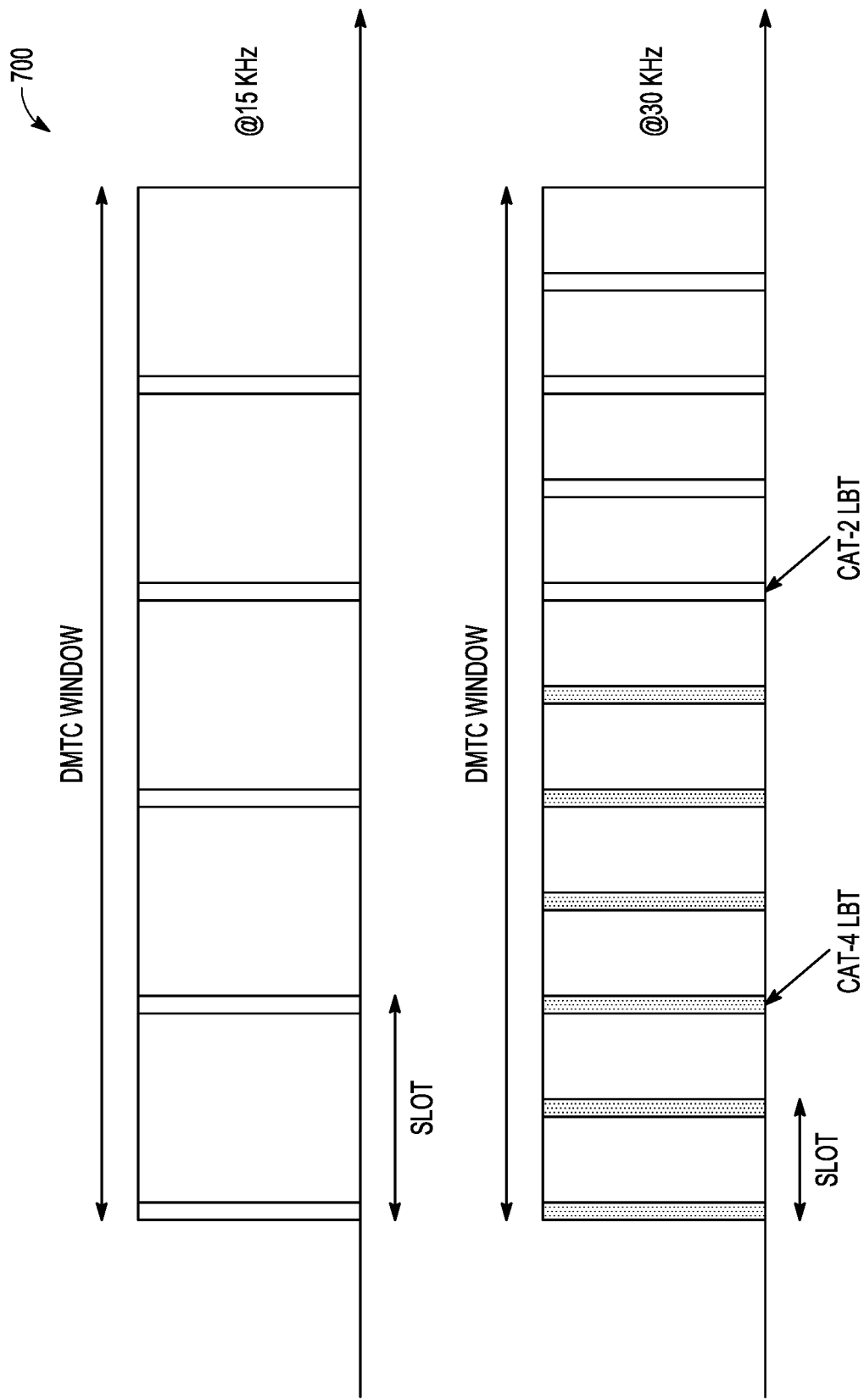
FIG. 7 illustrates Cat-4 LBT for each of X SSB occasions followed by Cat-2 LBT for Y SSB occasions, in an example embodiment.

Option 4: In one embodiment, regardless of the subcarriers spacing, the gNB initially performs Cat-4 LBT with the lowest priority class while guaranteeing Y number of occasions at the end of the DRS transmission window. After completing Cat-4 LBT, then Cat-2 LBT is used in the Y number of subsequent attempts, as shown in FIG. 7, where Y is 5 as an example. In one embodiment, this option is only used for subcarrier spacing of 30 kHz, 60, and/or 120 kHz.

FIG. 7 illustrates a procedure 700 with Cat-4 LBT for each of X SSB occasions followed by Cat-2 LBT for Y SSB occasions, in an example embodiment.

Option 5: In one embodiment, regardless of the subcarriers spacing, the gNB performs Cat-4 LBT, where the priority class is increased proportionally with the location within the DMTC where the LBT is attempted: lower priority class is used at the beginning of the DMTC window, and higher priority class is used toward the end of the DMTC. In one embodiment, the priority class to be used at a specific occasion within the DMTC is fixed, and predefined.

Option 6: In one embodiment, based on the subcarriers spacing (Z), and type of LBT used initially (Y=0 for CAT2 LBT or Y=1 for CAT4 LBT), the number of CAT2 LBT attempts is limited to a maximum value X(Y, Z), where X can be fixed (e.g. X=5 or 6) or it can be RRC configurable.

Option 7: In one embodiment, regardless of subcarrier spacing, based on the type of LBT used initially (Y=0 for CAT2 LBT or Y=1 for CAT4 LBT), the number of CAT2 LBT attempts is limited to a maximum value X(Y), where X can be fixed (e.g. X=5 or 6) or it can be RRC configurable.

Option 8: In one embodiment, there could exist 2 (Periodicity, Offset, Duration) tables for DRS transmissions, one for CAT2, and one for CAT4. To be more specific, (Periodicity2, Offset2, Duration2) for CAT2 DRS and (Periodicity4, Offset4, Duration4) for CAT4 DRS would need to be defined. This could allow for sequential or interleaving CAT2 and CAT4 DRS transmissions. For example, the CAT2 and CAT4 could each have a Periodicity equal to 40 ms so that the joint transmission looks like a 20 ms DRS periodicity. An example is shown in FIG. 8.

Figure 8:
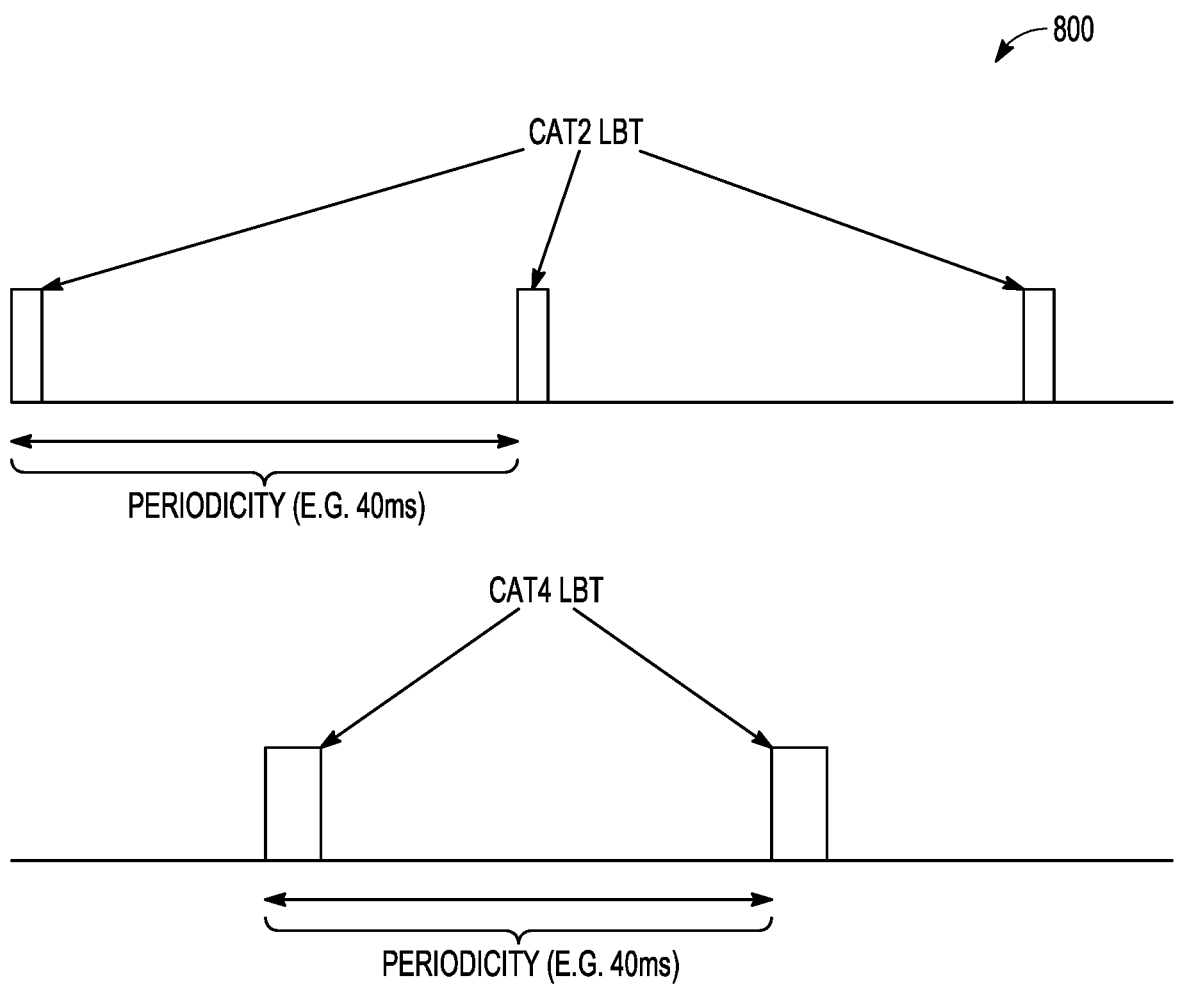
FIG. 8 illustrates the joint transmission of Cat-2 LBT DRS and Cat-4 LBT DRS, in an example embodiment.

FIG. 8 illustrates a diagram 800 of joint transmission of Cat-2 LBT DRS and Cat-4 LBT DRS, in an example embodiment.

Also, the CAT4 table could have a larger DMTC window than 5 ms since a Wi-Fi transmission can have a maximum duration of 5.484 ms, which would prevent the DRS from being transmitted. An example would be that the DMTC window for CAT4 transmissions could be 10 ms long.

The above disclosure provides a Table for maximum DRS duration as a function of periodicity and proposes a minimum periodicity of 25 ms or 40 ms for maximum DRS duration of 1 ms. In an example embodiment, fractional slot transmissions could be allowed where the first few or last few contiguous OFDM symbols of a slot are transmitted to meet the Table's requirements. In an example embodiment, due to the Wi-Fi max duration of 5.484 ms, the DMTC window could take only values greater than 5 ms; for example 6 or 10 ms. In an example embodiment, regardless of the subcarriers spacing, the gNB performs Cat-2 LBT for all the available occasions within the DMTC window. In an example embodiment, regardless of the subcarriers spacing, the gNB performs Cat-4 LBT for all the available occasions within the DMTC window. In an example embodiment, regardless of the subcarriers spacing, the gNB performs Cat-2 LBT for the first X occasions, and then it performs Cat-4 LBT. In an example embodiment, regardless of the subcarriers spacing, the gNB initially performs Cat-4 LBT with the lowest priority class while guaranteeing Y number of occasions at the end of the DRS transmission window. After completing Cat-4 LBT, then Cat-2 LBT is used in the Y number of subsequent attempts. In an example embodiment, regardless of the subcarriers spacing, the gNB performs Cat-4 LBT, where the priority class is increased proportionally with the location within the DMTC where the LBT is attempted: lower priority class is used at the beginning of the DMTC window, and higher priority class is used toward the end of the DMTC. In an example embodiment, a dependent clause is the priority class to be used at a specific occasion within the DMTC is fixed, and predefined.

In one embodiment, based on the subcarriers spacing (Z), and type of LBT used initially (Y=0 for CAT2 LBT or Y=1 for CAT4 LBT), the number of CAT2 LBT attempts is limited to a maximum value X(Y, Z), where X can be fixed (e.g. X=5 or 6) or it can be RRC configurable. In an example embodiment, regardless of subcarrier spacing, based on the type of LBT used initially (Y=0 for CAT2 LBT or Y=1 for CAT4 LBT), the number of CAT2 LBT attempts is limited to a maximum value X(Y), where X can be fixed (e.g. X=5 or 6) or it can be RRC configurable. There could exist 2 (Periodicity, Offset, Duration) tables for DRS transmissions, one for CAT2, and one for CAT4. To be more specific, (Periodicity2, Offset2, Duration2) for CAT2 DRS and (Periodicity4, Offset4, Duration4) for CAT4 DRS would need to be defined.

In Rel-15 NR, three multiplexing patterns are supported for multiplexing the remaining minimum system information (RMSI) control resource set (RMSI-CORESET) and synchronization signal/physical broadcast channel (SS/PBCH) blocks. We propose to retain the Rel-15 RMSI slot monitoring methodology for multiplexing pattern-1 except for essential changes (for example, re-interpreting SSB index i as the beam-index).

Figure 9:
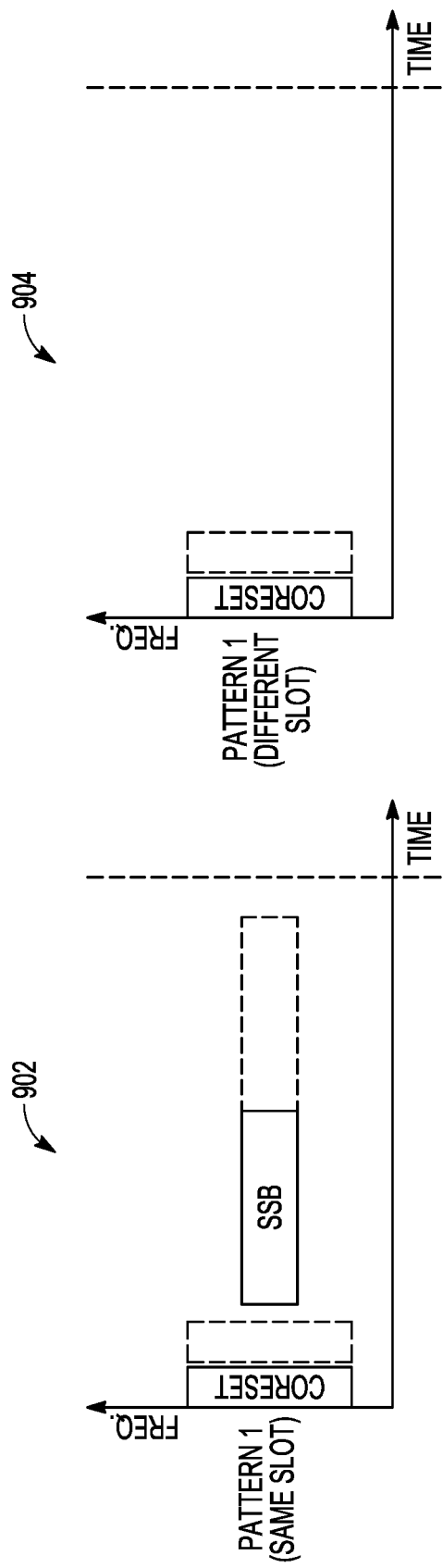
FIG. 9 illustrates a multiplexing pattern for SSB and remaining minimum system information (RMSI) CORESET transmission, in an example embodiment.

FIG. 9 illustrates a multiplexing pattern for SSB and remaining minimum system information (RMSI) CORESET transmission, in an example embodiment. More specifically, FIG. 9 illustrates multiplexing pattern 1 (e.g., patterns 902 and 904) where the synchronization signal block (SSB) (which includes SS/PBCH signals) and the CORESET (or RMSI) are time division multiplexed (TDM). The synchronization signals (SS) may include a primary synchronization signal (PSS) and a secondary synchronization signal (SSS).

FIG. 10 illustrates a diagram 1000 of RMSI configurations for 15 kHz and 30 kHz sub-carrier spacing in an NR frequency range 1 (NR-FR1) system, in an example embodiment.

In NR-FR1, a UE monitors RMSI every 20 ms. For 15 kHz, we have 10 slots in 10 ms and for 30 kHz we have 20 slots in 10 ms. The offset O is fixed.

Type-0 PDCCH (or CORESET 0) monitoring mechanism for NR-U is discussed herein. Type-0 PDCCH monitoring for NR does not address the NR-U use-case directly. The SSB index as used in NR to define PDCCH monitoring does not apply to NR-U—it is replaced by a beam-index (e.g., as may be designated as Q). Further DRS windows are used to prioritize RMSI channel access which may also be considered.

Most of the flexibility that is allowed in NR-Rel-15 FR1—allowing consecutive slot monitoring, allowing both 1 and 2 CORESET PDCCH monitoring, allows RMSI transmission both inside and outside of a DRS window.

Figure 11:
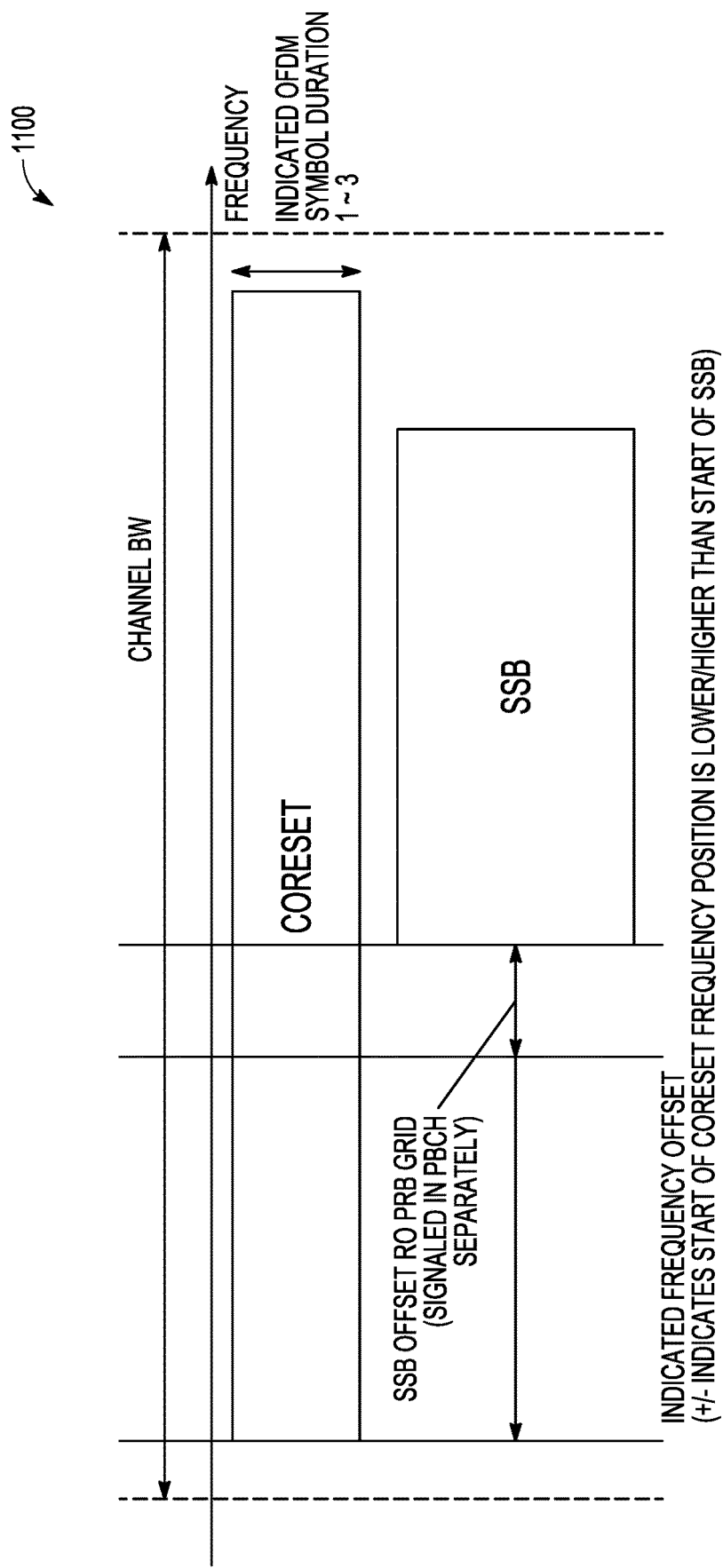
FIG. 11 illustrates time-division multiplexing (TDM) of a CORESET and synchronization signal block (SSB) transmissions, in an example embodiment.

FIG. 11 illustrates a diagram 1100 of time-division multiplexing (TDM) of a CORESET and synchronization signal block (SSB) transmissions, in an example embodiment.

In an example embodiment, a UE monitors PDCCH in the Type0-PDCCH CSS set over two consecutive slots. The first of the two consecutive slots monitored by PDCCH is determined using $n_0 = (O \cdot 2^\mu + \lfloor i \cdot M \rfloor) \bmod N_{slot}^{frame,\mu}$ measured from a frame boundary, where $n_0$ is the slot index. The frame for RMSI monitoring SFNC is determined as the frame containing a candidate SSB position. Several parameters are used in calculating the slot index: O, a time offset for determining n0; M, a factor used to determine n0; N, denotes the number of search spaces in a slot; and Q, is the maximum number of beams (or the beam index). TABLE 2 below provides example values for M and N.

TABLE 2

| M | N (Number of Search Spaces in a slot) | Additional information |
|---|---|---|
| 0.5 | 2 candidates per slot | M = 0.5 needs only 4 slots to transmit 8 RMSI instances, but it cannot accommodate 2-symbol CORESETs |
| 1 | 1 candidate per slot | M = 1 needs 8 slots to transmit 8 RMSI instances, but it can accommodate both 1-symbol and 2-symbol CORESETs. This is beneficial in providing PDCCH coverage. |
| 2 | 1 candidate per 2 slots | RMSI location is extended to multiple DRS transmission windows so this is not a preferred option. |

Since half-slot shift granularity is not considered for RMSI transmission, so beam-index (Q) values of 2, 4, 6, and 8 may be considered sufficient for describing Type-0 PDCCH monitoring. If beam-index is unknown (Q in SIB1) then RMSI monitoring occurs in all slots. The values for 0, N (number of search spaces per slot), and M can be down-selected as the DRS transmission window is limited to 5 ms. A set of 0 values are monitored for each beam-index.

In an example embodiment, the Rel-15 PDCCH monitoring methodology may be re-used for multiplexing pattern-1 with re-interpreting SSB index i as the beam-index. The same design is applicable for CAT-2 or CAT-4 LBT situations (15 kHz and 30 kHz).

The following shows an example of such down-selection that may be sufficient. Note that for a given value of Q, only two options for PDCCH monitoring are presented (1-bit in MIB): RMSI Case 1 with 1 CORESET per slot (potentially 2-symbol CORESET), and RMSI case 2 with 2 CORESETs per slot (1-symbol CORESET). In an example embodiment, the RMSI may be monitored with the same periodicity as that of SSB.

In NR-U, a DRS transmission window is 5 ms with a periodicity of 20/40/80/160 ms. A DRS transmission may contain one or more SSBs. In an exemplary embodiment, the following options for the RMSI transmission may be used:

Proposal 1: Restrict Q Values for RMSI Case 1 (Related to FIG. 12)

FIG. 12A and FIG. 12B illustrate corresponding diagrams 1200A and 1200B RMSI configurations for 15 kHz and 30 kHz sub-carrier spacing in an NR system with a maximum number of beams (Q) restricted to 2, 4, 6, or 8, in an example embodiment.

Both 1-symbol and 2-symbol CORESETs can be utilized with monitoring periodicity of DRS. If SSBs are transmitted in the second half frame, we can use the same proposals as below after applying an offset of 5 ms by adding 5 to 0 set values.

In the case of 15 kHz and 30 kHz, for RMSI case 1, a 5 ms window is not sufficient to transmit RMSI for all associated SSBs. The Q values may be restricted to Q=2, 4. But this option allows a 2-symbol CORESET and allows addressing more users in the same slot. Alternate solutions to this issue are captured in Proposal 2 and Proposal 3.

In an example embodiment, a UE may receive an SSB transmission from a base station, including SS and PBCH. The UE may derive a beam index from the SSB transmission. The UE may derive a candidate beam index based on the beam index (e.g., two candidate beam indices may be used per slot). A candidate beam index may then be mapped to a slot, obtaining a slot number. RMSI information (e.g., a CORESET associated with Type-0 PDCCH or another type of PDCCH) may be received based on the determined slot number.

In the case of 15 kHz and 30 kHz, for RMSI case 2, the RMSI opportunities are equal over time. Q can be 2, 4, 6, and 8. This option, however, is limited to a 1-symbol CORESET. In each slot, since M=0.5, two candidates may be transmitted.

Two slot monitoring may be beneficial for utilizing the second slot for RMSI transmission if Q=1 or 2 (30 kHz). Two-slot monitoring is also beneficial for accessing more UE groups for transmission of other information like paging. It provides flexibility to NW in case RMSI transmission is interrupted by some other transmission like paging—example PDCCH Type OA (defaults to Type 0—OSI), Type 1 (defaults to Type 0—RACH), Type 2 (defaults to Type 0—paging)).

Proposal 2: Extend the RMSI Transmission Beyond DRS Window of 5 ms (Cat4 LBT for Outside DRS Window) (Related to FIG. 13)

FIG. 13A and FIG. 13B illustrate corresponding diagrams 1300A and 1300B with RMSI configurations for 15 kHz and 30 kHz sub-carrier spacing in an NR system with a maximum number of beams (Q) restricted to 2, 4, 6, or 8 and RMSI transmission beyond a DRS/DMTC window of 5 ms, in an example embodiment.

In this proposal, we consider the case where RMSI transmission is not restricted to a 5 ms DRS transmission window. The key advantage of this proposal is that we can support Q values of 2, 4, 6, and 8.

Proposal 3: Continuous RMSI Monitoring in the Next DRS Transmission Window (Cat 2 & Cat4 LBT) (Related to FIG. 14)

FIG. 14A, FIG. 14B, and FIG. 14C illustrate corresponding diagrams 1400A, 1400B, and 1400C of RMSI configurations for 15 kHz and 30 kHz sub-carrier spacing in an NR system with a maximum number of beams (Q) restricted to 2, 4, 6, or 8 and continuous RMSI monitoring in next DRS/DMTC transmission window, in an example embodiment.

In connection with the 15 kHz configuration, the RMSI opportunities are equal over time in Q/2 5 ms cycles for RMSI case 2 and in Q 5m cycles for RMSI case 1 for Q={4, 6, 8}. The monitoring periodicity for RMSI case 2 is Q/2 and for RMSI case 1 is Q. This solution is not required for Q=2. Table 3 illustrates options for M, Q, number of DRS transmissions, and TDM offsets for the 15 kHz configuration.

TABLE 3

| | M | Q | Number of DRS transmission windows required for equal opportunities | TDM Offset to obtain starting SSB in next DRS transmission window | Monitoring Periodicity |
|---|---|---|---|---|---|
| RMSI Case 2 | 0.5 | 8 | 4 | Offset 0 + TDM {−1, −2, −3} | Q/2 |
| RMSI Case 2 | 0.5 | 6 | 3 | Offset 0 + TDM {−2, −1} | Q/2 |
| RMSI Case 2 | 0.5 | 4 | 2 | Offset 0 + TDM {−1} | Q/2 |
| RMSI Case 2 | 0.5 | 2 | 1 | Offset 0 | Q |
| RMSI Case 1 | 1 | 8 | 8 | Offset 0 + TDM {−5, −2, −7, −4, −1, −6, −3} | Q |
| RMSI Case 1 | 1 | 6 | 6 | Offset 0 + TDM {−5, −4, −3, −2, −1} | Q |
| RMSI Case 1 | 1 | 4 | 4 | Offset 0 + TDM {−1, −2, −3} | Q |
| RMSI Case 2 | 1 | 2 | 1 | Offset 0 | Q |

In connection with the 30 kHz configuration, the RMSI opportunities are equal over time in Q/2 5m cycles for RMSI case 1 for Q={4, 6, 8}. The monitoring periodicity for RMSI case 2 is Q/2 and for RMSI case 1 is Q. This solution is not required for Q=2 and Q=4 (RMSI Case 2). Table 4 illustrates options for M, Q, number of DRS transmissions, and TDM offsets for the 30 kHz configuration.

TABLE 4

| | M | Q | Number of DRS transmission windows required for equal opportunities | Offset + TDM Offset to obtain starting SSB in next DRS transmission window | Monitoring Periodicity |
|---|---|---|---|---|---|
| RMSI Case 2 | 0.5 | 8 | 2 | Offset 0 + TDM {−2} | Q/2 |
| RMSI Case 2 | 0.5 | 6 | 3 | Offset 0 + TDM {−2} | Q/2 |
| RMSI Case 2 | 0.5 | 4 | 1 | Offset 0 | Q/2 |
| RMSI Case 2 | 0.5 | 2 | 1 | Offset 0 | Q |
| RMSI Case 1 | 1 | 8 | 4 | Offset 0 + TDM {−2, −4, −6} | Q |
| RMSI Case 1 | 1 | 6 | 3 | Offset 0 + TDM {−4, −2} | Q |
| RMSI Case 1 | 1 | 4 | 2 | Offset 0 + TDM {−2} | Q |
| RMSI Case 1 | 1 | 2 | 1 | Offset 0 | Q |

Different TDM offsets can be associated with SFN based on a specified periodicity T (T can be the minimum DRS periodicity=40 ms). The following Table 5 shows 2 examples. More specifically, Table 5 illustrates TDM offsets for the 30 kHz configuration.

TABLE 5

| SFN | TDM offset for RMSI Case-1, M = 1, Q = 8 (15 kHz) | TDM offset for RMSI Case-2, M = 0.5, Q = 8 (15 kHz) |
|---|---|---|
| 0 | 0 | 0 |
| T | −5 | −1 |
| 2T | −2 | −2 |
| 3T | −7 | −3 |
| 4T | −4 | 0 |
| 5T | −1 | −1 |
| 6T | −6 | −2 |
| 7T | −3 | −3 |

In an example embodiment, the starting slot monitored by the PDCCH in the next DRS transmission window is determined using the following equation: $n_0 = (O\ 2^\mu + \text{TDM\_offset} + \lfloor i \cdot M \rfloor)\ \text{rem}\ N_{slot}^{frame,\mu}$.

In case of 15 kHz and 30 kHz, the slot number values in a 5 ms DRS transmission window ranges from $0 \leq n_0 \leq 4$ and $0 \leq n_0 \leq 9$ respectively. In an example embodiment, slot numbers greater than these values and negative values may be ignored or may be considered in increasing order. Once the starting slot number is determined, the RMSI is assumed to be numbered in increasing order till a maximum value of the beam index, Q, is reached. If slots are still available for transmission in the DRS window, the RMSI is transmitted from SSB 0 again.

EXAMPLES

In connection with Table 6, in case of 15 kHz, Q=8, M=1, the slots monitored in the first 5 ms DRS transmission window is determined using offset O=0 and TDM_offset=0.

TABLE 6

| SSB | 0 | 1 | 2 | 3 | 4 | 5 | 6 | 7 |
|---|---|---|---|---|---|---|---|---|
| Slot number | 0 | 1 | 2 | 3 | 4 | *5* | *6* | *7* |

In connection with Table 7, the starting slot in the next DRS transmission window is obtained using offset O=0 and TDM_offset=−5.

TABLE 7

| SSB | 0 | 1 | 2 | 3 | 4 | 5 | 6 | 7 |
|---|---|---|---|---|---|---|---|---|
| Slot number | *-5* | *-4* | *-3* | *-2* | *-1* | 0 | 1 | 2 |

In Table 7, slot 0, 1, 2 in the window contains the RMSI for SSB 5, 6, 7.

In connection with Table 8, the next cycle of RMSI is obtained by using offset O=Q and TDM_offset=−5.

TABLE 8

| SSB | 0 | 1 | 2 | 3 | 4 | 5 | 6 | 7 |
|---|---|---|---|---|---|---|---|---|
| Slot number | 3 | 4 | *5* | *6* | *7* | *8* | *9* | *0* |

In Table 8, slots 3, 4 contain RMSI for SSB 0, and 1.

Second-Slot DRS Transmission

In an example embodiment, if the DRS transmission occurs in the second half of the DMTC measurement window, the starting slot monitored by the PDCCH in the next DRS transmission window is determined using the following equation: $n_0 = (O \cdot 2^\mu + TDM_{offset} + Half_{frame_{offset}} \lfloor i \cdot M \rfloor)$ rem $N_{slot}^{frame,\mu}$.

In case of 15 kHz and 30 kHz, the slot number values in a 5 ms DRS transmission window ranges from $5 \le n_0 \le 9$ and $10 \le n_0 \le 19$ respectively. The Half_frame_offset=5 for 15 kHz and 10 for 30 kHz. Slot numbers less than these values and negative values should be ignored and are always considered in increasing order. Once the starting slot number is determined, the RMSI is assumed to be numbered in increasing order till the beam index, Q. If slots are still available for transmission in the DRS window, the RMSI is transmitted from SSB 0 again. The monitoring periodicity and TDM offset are the same as the first slot transmission.

Figure 15C:
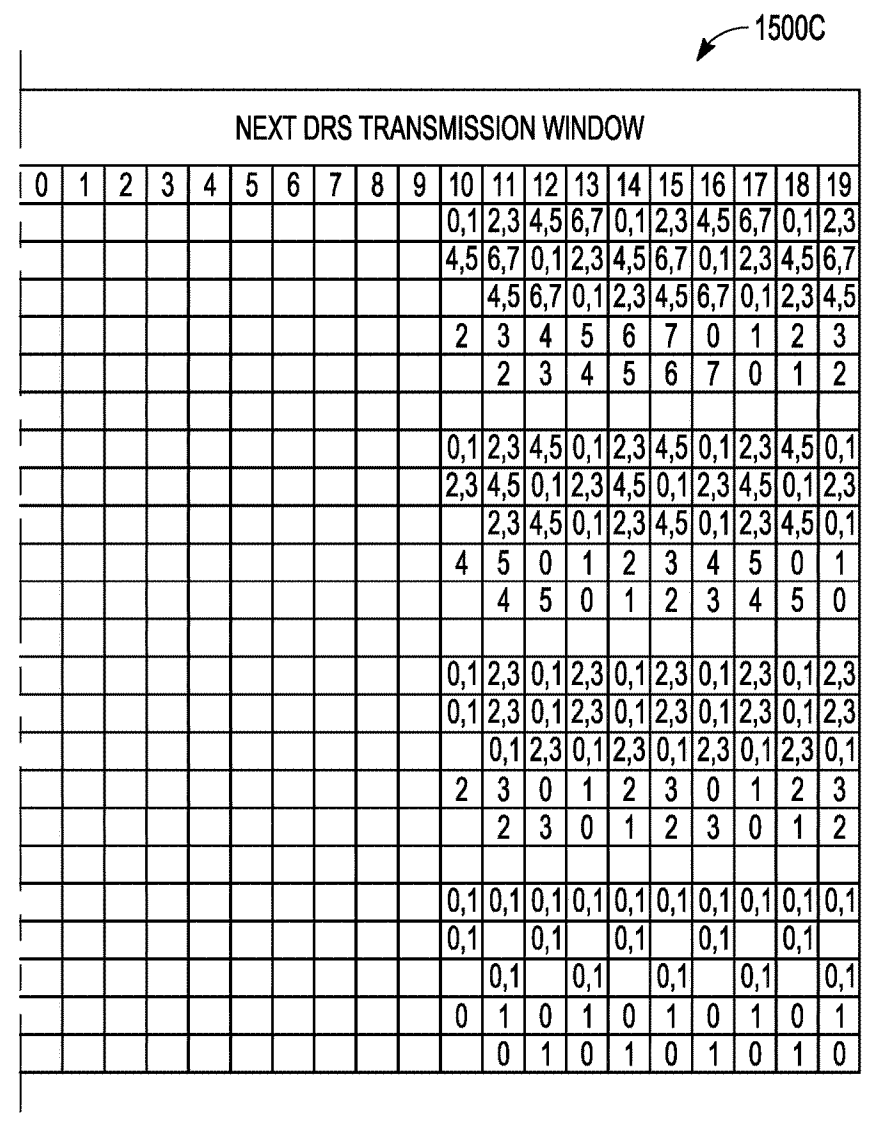

FIG. 15A, FIG. 15B, and FIG. 15C illustrate corresponding diagrams 1500A, 1500B, and 1500C of RMSI configurations for 15 kHz and 30 kHz sub-carrier spacing in an NR system with a maximum number of beams (Q) restricted to 2, 4, 6, or 8 and a second slot DRS transmission, in an example embodiment.

Proposal 4: RMSI Monitoring on SFN, Slot Index Determined Based on Presence of Candidate SSB Positions (Related to FIG. 15)

In an example embodiment, SFNc and Nc are determined by the presence of the i-th candidate SSB position in the same slot. Two search space sets in each slot may be used. In an example embodiment, a search space set can be associated with each SSB in the slot (similar to RMSI case 2 in Proposal 1). In an example embodiment, both search space sets may overlap in time. In an example embodiment, two consecutive slots may be monitored.

In an example embodiment, a method of PDCCH monitoring in NR-U includes a set of offset values, a determination of SFN, determination of a slot index, and a determination of CORESET associated with a search space set. In an example embodiment, a set of offset values provides a set of slot indices associated with a given SSB beam index. In an example embodiment, a set of offset values is associated with a half-frame as indicated in the MIB. In an example embodiment, the determination of SFN is based on the presence of a candidate SSB beam index. In an example embodiment, the determination of the slot index is limited by a DRS transmission window.

Figure 16:
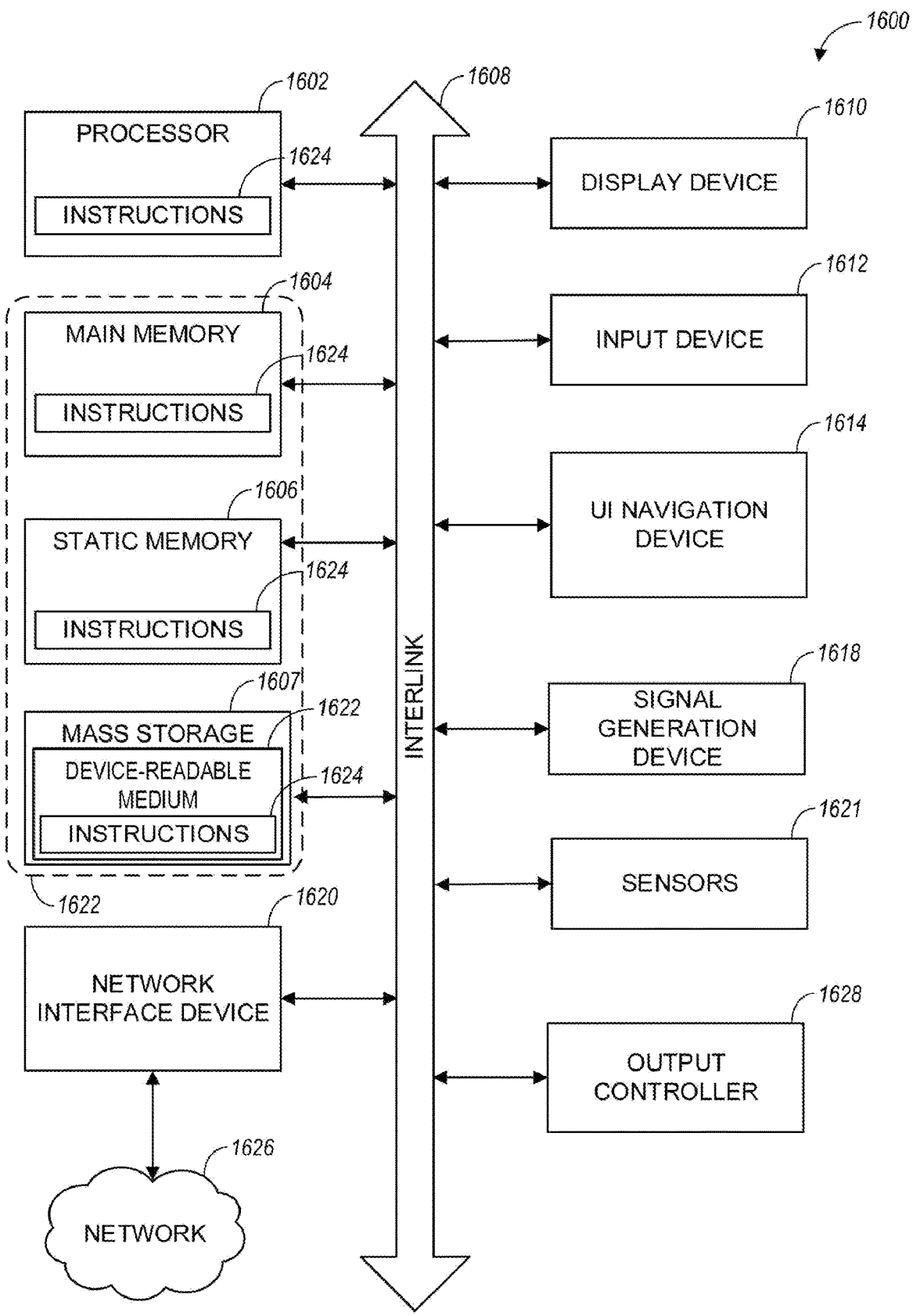
FIG. 16 illustrates a block diagram of a communication device such as an evolved Node-B (eNB), a new generation Node-B (gNB), an access point (AP), a wireless station (STA), a mobile station (MS), or user equipment (UE), in an example embodiment.

FIG. 16 illustrates a block diagram of a communication device such as an evolved Node-B (eNB), a next generation Node-B (gNB), an access point (AP), a wireless station (STA), a mobile station (MS), or user equipment (UE), in accordance with some aspects and to perform one or more of the techniques disclosed herein. In alternative aspects, the communication device 1600 may operate as a standalone device or may be connected (e.g., networked) to other communication devices.

Circuitry (e.g., processing circuitry) is a collection of circuits implemented in tangible entities of the device 1600 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components concerning the device 1600 follow.

In some aspects, the device 1600 may operate as a standalone device or may be connected (e.g., networked) to other devices. In a networked deployment, the communication device 1600 may operate in the capacity of a server communication device, a client communication device, or both in server-client network environments. In an example, the communication device 1600 may act as a peer communication device in peer-to-peer (P2P) (or other distributed) network environment. The communication device 1600 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 1600 may include a hardware processor 1602 (e.g., a central processing unit (CPU), a graphics processing unit (GPU), a hardware processor core, or any combination thereof), a main memory 1604, a static memory 1606, and mass storage 1607 (e.g., hard drive, tape drive, flash storage, or other block or storage devices), some or all of which may communicate with each other via an interlink (e.g., bus) 1608.

The communication device 1600 may further include a display device 1610, an alphanumeric input device 1612 (e.g., a keyboard), and a user interface (UI) navigation device 1614 (e.g., a mouse). In an example, the display device 1610, input device 1612, and UI navigation device 1614 may be a touchscreen display. The communication device 1600 may additionally include a signal generation device 1618 (e.g., a speaker), a network interface device 1620, and one or more sensors 1621, such as a global positioning system (GPS) sensor, compass, accelerometer, or another sensor. The communication device 1600 may include an output controller 1628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1607 may include a communication device-readable medium 1622, on which is stored one or more sets of data structures or instructions 1624 (e.g., software) embodying or utilized by any one or more of the techniques or functions described herein. In some aspects, registers of the processor 1602, the main memory 1604, the static memory 1606, and/or the mass storage 1607 may be, or include (completely or at least partially), the device-readable medium 1622, on which is stored the one or more sets of data structures or instructions 1624, embodying or utilized by any one or more of the techniques or functions described herein. In an example, one or any combination of the hardware processor 1602, the main memory 1604, the static memory 1606, or the mass storage 1616 may constitute the device-readable medium 1622.

As used herein, the term "device-readable medium" is interchangeable with "computer-readable medium" or "machine-readable medium". While the communication device-readable medium 1622 is illustrated as a single medium, the term "communication device-readable medium" may include a single medium or multiple media (e.g., a centralized or distributed database, and/or associated caches and servers) configured to store the one or more instructions 1624. The term "communication device-readable medium" is inclusive of the terms "machine-readable medium" or "computer-readable medium", and may include any medium that is capable of storing, encoding, or carrying instructions (e.g., instructions 1624) for execution by the communication device 1600 and that causes the communication device 1600 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1624 may further be transmitted or received over a communications network 1626 using a transmission medium via the network interface device 1620 utilizing any one of several transfer protocols. In an example, the network interface device 1620 may include one or more physical jacks (e.g., Ethernet, coaxial, or phone jacks) or one or more antennas to connect to the communications network 1626. In an example, the network interface device 1620 may include a plurality of antennas to wirelessly communicate using at least one of single-input-multiple-output (SIMO), MIMO, or multiple-input-single-output (MISO) techniques. In some examples, the network interface device 1620 may wirelessly communicate using Multiple User MIMO techniques.

The term "transmission medium" shall be taken to include any intangible medium that is capable of storing, encoding or carrying instructions for execution by the communication device 1600, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a user equipment (UE), the apparatus comprising:
processing circuitry, wherein to configure the UE for shared spectrum channel access in a Fifth Generation New Radio (5G-NR) system, the processing circuitry is to:
decode a synchronization signal (SS)/physical broadcast channel (PBCH) block (SSB) to obtain a master information block (MIB);
determine system information block 1 (SIB1) configuration information using the MIB, the SIB1 configuration information to configure a Type 0 physical downlink control channel (PDCCH) common search space (CSS) set (CORESET);
determine a slot number of at least one slot of slots, wherein the at least one slot includes the SSB and the CORESET;
wherein the determining of the slot number is based on an SS/PBCH block index of the SSB and further based on the SSB and CORESET in the at least one slot of slots being multiplexed according to multiplexing pattern 1;
monitor for a PDCCH in the Type 0 PDCCH CSS set over the at least one slot associated with the slot number, the at least one slot of the slots including the SSB and the CORESET multiplexed according to multiplexing pattern 1;
detect the PDCCH in at least one of the Type 0 PDCCH monitoring occasions;
and decode a SIB 1 using downlink control information (DCI) received via the detected PDCCH;
and memory coupled to the processing circuitry and configured to store the SSB.

2. The apparatus of claim 1, wherein the processing circuitry is further to:
determine the slot number of the at least one slot of the slots further based on a time offset value, the time offset value corresponding to an index of a first symbol of the CORESET in the at least one of the slots.

3. The apparatus of claim 2, wherein the at least one slot of the slots comprises two neighboring slots.

4. The apparatus of claim 2, wherein the slot number of the at least one slot is determined as $n_0 = (O \cdot 2^\mu + \lfloor \bar{i} \cdot M \rfloor) \bmod N_{slot}^{frame,\mu}$, where O is the time offset value, M is a factor corresponding to the time offset value, and $\mu$ is an integer selected from a set of integers including $\{0,1,2,3\}$, and $\bar{i}$ is the SS/PBCH block index.

5. The apparatus of claim 1, further comprising transceiver circuitry coupled to the processing circuitry; and, one or more antennas coupled to the transceiver circuitry.

6. A non-transitory computer-readable storage medium that stores instructions for execution by one or more processors of a user equipment (UE), the instructions to configure the UE for shared spectrum channel access in a Fifth Generation New Radio (5G-NR) system, and to cause the UE to perform operations comprising:
decoding a synchronization signal (SS)/physical broadcast channel (PBCH) block (SSB) to obtain a master information block (MIB);
determining system information block 1 (SIB1) configuration information using the MIB, the SIB1 configuration information to configure a Type 0 physical downlink control channel (PDCCH) common search space (CSS) set (CORESET);
determine a slot number of at least one slot of slots, wherein the at least one slot includes the SSB and the CORESET;
wherein the determining of the slot number is based on an SS/PBCH block index of the SSB and further based on the SSB and CORESET in the at least one slot of slots being multiplexed according to multiplexing pattern 1;
monitoring for a PDCCH in the Type 0 PDCCH CSS set over the at least one slot associated with the slot number, the at least one slot of the slots including the SSB and the CORESET multiplexed according to multiplexing pattern 1;
detecting the PDCCH in at least one of the Type 0 PDCCH monitoring occasions; and
decoding a SIB1 using downlink control information (DCI) received via the detected PDCCH.

7. The non-transitory computer-readable storage medium of claim 6, the operations further comprising:
determining the slot number of the at least one slot of the slots further based on a time offset value, the time offset value corresponding to an index of a first symbol of the CORESET in the at least one of the slots.

8. The non-transitory computer-readable storage medium of claim 7, wherein the at least one slot of the slots comprises two neighboring slots.

9. The non-transitory computer-readable storage medium of claim 7, wherein the slot number of the at least one slot is determined as
$n_0 = (O \cdot 2^\mu + \lfloor \bar{i} \cdot M \rfloor) \bmod N_{slot}^{frame,\mu}$, where O is the time offset value, M is a factor corresponding to the time offset value, and $\mu$ is an integer selected from a set of integers including $\{0,1,2,3\}$, and $\bar{i}$ is the SS/PBCH block index.

* * * * *

UNITED STATES PATENT AND TRADEMARK OFFICE
CERTIFICATE OF CORRECTION

| | | |
|---|---|---|
| PATENT NO. | : 11,818,773 B2 | Page 1 of 1 |
| APPLICATION NO. | : 16/910957 | |
| DATED | : November 14, 2023 | |
| INVENTOR(S) | : Mondal et al. | |

It is certified that error appears in the above-identified patent and that said Letters Patent is hereby corrected as shown below:

In the Claims

In Column 21, Line 38, in Claim 1, after "occasions;", insert --and--

In Column 21, Line 39, in Claim 1, before "decode", delete "and"

In Column 21, Line 40, in Claim 1, after "PDCCH;", insert --and--

In Column 21, Line 41, in Claim 1, before "memory", delete "and"

Signed and Sealed this
Twenty-eighth Day of January, 2025

Coke Morgan Stewart
*Acting Director of the United States Patent and Trademark Office*